United States Patent
Balasubramanian et al.

(10) Patent No.: US 12,200,503 B2
(45) Date of Patent: Jan. 14, 2025

(54) TIME DIVISION DUPLEX CONFIGURATION SELECTION FOR CITIZEN BAND RADIO SERVICE OPERATION WITH TDD CONFIGURATION MISMATCH

(71) Applicant: Celona, Inc., Cupertino, CA (US)

(72) Inventors: Srinivasan Balasubramanian, San Diego, CA (US); Mehmet Yavuz, Palo Alto, CA (US)

(73) Assignee: Celona, Inc., Cupertino, CA (US)

( * ) Notice: Subject to any disclaimer, the term of this patent is extended or adjusted under 35 U.S.C. 154(b) by 344 days.

(21) Appl. No.: 17/584,809

(22) Filed: Jan. 26, 2022

(65) Prior Publication Data

US 2022/0240098 A1 Jul. 28, 2022

Related U.S. Application Data

(60) Provisional application No. 63/191,244, filed on May 20, 2021, provisional application No. 63/169,772, (Continued)

(51) Int. Cl.
*H04W 16/14* (2009.01)
*H04L 5/14* (2006.01)
(Continued)

(52) U.S. Cl.
CPC ............ *H04W 16/14* (2013.01); *H04L 5/1469* (2013.01); *H04L 27/2607* (2013.01); *H04W 60/04* (2013.01)

(58) Field of Classification Search
CPC .... H04W 16/14; H04W 60/04; H04L 5/1469; H04L 27/2607; H04L 27/2601
See application file for complete search history.

(56) References Cited

U.S. PATENT DOCUMENTS

2020/0305159 A1* 9/2020 Raghothaman ... H04W 72/0453
2021/0392549 A1* 12/2021 Hafeez ................. H04W 28/16
(Continued)

FOREIGN PATENT DOCUMENTS

WO WO-2020230092 A1 * 11/2020

OTHER PUBLICATIONS

3GPP TSG-RAN Working Group 4 Meeting #80; R4- 165162; Source: DISH Network; Title: CBRS 3.5 GHz band for LTE in the United States; Gothenburg, Sweden, Aug. 22-Aug. 26, 2016. (Year: 2016).*
(Continued)

*Primary Examiner* — Mohammed S Chowdhury
(74) *Attorney, Agent, or Firm* — Jaquez Land Greenhaus & McFarland; Bruce W. Greenhaus

(57) ABSTRACT

Time Division Duplex (TDD) Configuration Selection for CBRS operation with TDD Configuration Mismatch methods and apparatus are disclosed. The methods and apparatus allocate CBRS bandwidth and select TDD configurations in a manner that allows maximum cooperation between GAA and PAL CBSDs, and includes procedures that avoid forcing the procedures into a fallback mode whenever a TDD configuration mismatch occurs. The methods and apparatus allocate an appropriate TDD configuration across all of the CBSDs (BS/APs) in the CBRS network so that there is minimal interreference between the CBSDs and so that there is uniform usage of the bandwidth in terms of use cases across all of the CBSDs in a given CBRS network. The disclosed methods and apparatus determine how to select the correct TDD configurations for the CBSDs (or BS/APs) based on the constitution of the CBSDs, and taking the GAA and PAL CBSD requirements into account.

20 Claims, 10 Drawing Sheets

Related U.S. Application Data filed on Apr. 1, 2021, provisional application No. 63/141,906, filed on Jan. 26, 2021.

(51) Int. Cl.
*H04L 27/26* (2006.01)
*H04W 60/04* (2009.01)

(56) References Cited

U.S. PATENT DOCUMENTS

| | | | | |
|---|---|---|---|---|
| 2022/0116190 A1* | 4/2022 | Hafeez | ............... | H04L 5/14 |
| 2023/0131512 A1* | 4/2023 | Furuichi | ............ | H04W 52/243 455/454 |

OTHER PUBLICATIONS

IEEE Coexistence Performance of GAA Use Cases using LTE-TDD Technologies in 3.5GHz CBRS Spectrum; Du Ho Kang, Kumar Balachandran, Mats Buchmayer;2018 IEEE International Symposium on Dynamic Spectrum Access Networks (DySPAN) (Year: 2018).*

Signaling Protocols and Procedures for Citizens Broadband Radio Service (CBRS): Spectrum Access System (SAS)—Citizens Broadband Radio Service Device (CBSD) Interface Technical Specification; Document WINNF-16-S-0016; Version V2.0.0; Jun. 14, 2017 (Year: 2017).*

CBRS Coexistence Technical Specification; CBRSA-TS-2001; V1.0. 0; Feb. 1, 2018 (Year: 2018).*

* cited by examiner

| Configuration | 3GPP release | Downlink to uplink switch point periodicity (ms) | Subframe number 0 | 1 | 2 | 3 | 4 | 5 | 6 | 7 | 8 | 9 | Number of subframes / frame D [DL] | U [UL] | S [SSF] |
|---|---|---|---|---|---|---|---|---|---|---|---|---|---|---|---|
| 0  304a | 8 | 5 | D | S | U | U | U | D | S | U | U | U | 2 | 6 | 2 |
| 1  304b | 8 | 5 | D | S | U | U | D | D | S | U | U | D | 4 | 4 | 2 |
| 2  304c | 8 | 5 | D | S | U | D | D | D | S | U | D | D | 6 | 2 | 2 |
| 3  304d | 8 | 10 | D | S | U | U | U | D | D | D | D | D | 6 | 3 | 1 |
| 4  304e | 8 | 10 | D | S | U | U | D | D | D | D | D | D | 7 | 2 | 1 |
| 5  304f | 8 | 10 | D | S | U | D | D | D | D | D | D | D | 8 | 1 | 1 |
| 6  304g | 8 | 5 | D | S | U | U | U | D | S | U | U | D | 3 | 5 | 2 |

Increasing frame configuration

D  Downlink subframe
S  Special subframe (see below)
U  Uplink subframe

SSF Special SubFrame, normal CP (Dw / GP / Up)

| Configuration | 3GPP release | DwPTS (Ts) | UpPTS (Ts) | Number of OFDM symbols / subframe | | |
|---|---|---|---|---|---|---|
| | | | | Dw | GP | Up |
| 0 | 8 | 6592 | 2192 | 3 | 10 | 1 |
| 1 | 8 | 19760 | 2192 | 9 | 4 | 1 |
| 2 | 8 | 21952 | 2192 | 10 | 3 | 1 |
| 3 | 8 | 24144 | 2192 | 11 | 2 | 1 |
| 4 | 8 | 26336 | 2192 | 12 | 1 | 1 |
| 5 | 8 | 6592 | 4384 | 3 | 9 | 2 |
| 6 | 8 | 19760 | 4384 | 9 | 3 | 2 |
| 7 | 8 | 21952 | 4384 | 10 | 2 | 2 |
| 8 | 8 | 24144 | 4384 | 11 | 1 | 2 |
| 9 | 11 | 13168 | 4384 | 6 | 6 | 2 |

342

Increasing SSF configuration

DwPTS   Downlink Pilot Time Slot
UpPTS   Uplink Pilot Time Slot
GP      Guard period

TIME DIVISION DUPLEX CONFIGURATION SELECTION FOR CITIZEN BAND RADIO SERVICE OPERATION WITH TDD CONFIGURATION MISMATCH

CLAIM OF PRIORITY TO PREVIOUSLY FILED PROVISIONAL APPLICATIONS—INCORPORATION BY REFERENCE

This utility application Ser. No. 17/584,809 claims priority under 35 USC section 111 (b) and under 35 USC section 119 (e), to the following three earlier-filed provisional applications: provisional application No. 63/141,906, filed Jan. 26, 2021, entitled "Time Division Duplex Configuration Selection for Citizen Band Radio Service Operation", and provisional application No. 63/169,772, filed Apr. 1, 2021, entitled "Time Division Duplex Configuration Selection for Citizen Band Radio Service Operation with TDD Configuration Mismatch", and provisional application No. 63/191,244, filed May 20, 2021, entitled "Time Division Duplex Configuration Selection for Citizen Band Radio Service Operation with TDD Configuration Mismatch"; and the contents of the above-cited earlier-filed provisional applications (App. No.: 63/141,906), (App. No.: 63/169,772) and (App. No.: 63/191,244) are all hereby incorporated by reference herein as if set forth in full.

BACKGROUND

(1) Technical Field

The disclosed methods and apparatus generally relate to systems for preventing interference between communications networks. In particular, the disclosed methods and apparatus prevent interference by transmitters of a first communications network with receivers of a nearby second network operating on adjacent frequencies.

(2) Background

The wireless industry has experienced tremendous growth in recent years. Wireless technology is rapidly improving, and faster and more numerous broadband communication networks have been installed around the globe. These networks have now become key components of a worldwide communication system that connects people and businesses at speeds and on a scale unimaginable just a couple of decades ago. The rapid growth of wireless communication is a result of increasing demand for more bandwidth and services. This rapid growth is in many ways supported by standards. For example, 4G LTE has been widely deployed over the past years, and the next generation system, 5G NR (New Radio) is now being deployed. In these wireless systems, multiple mobile devices are served voice services, data services, and many other services over wireless connections so they may remain mobile while still connected.

Wireless networks have a wide range of applications and uses. Enterprises particularly have a great interest in implementing wireless networks at their enterprise location, and digital solutions more generally, to improve efficiency and reduce costs. For the purposes of this disclosure, an Enterprise may comprise a business, such as a large multi-national corporation, a small business, such as a car dealership, a governmental agency, or any other organization having a particular campus upon which it would be useful for the enterprise to have access to a private wireless enterprise communication network (hereafter an "Enterprise Network"). Enterprises benefit from optimizing their computing, storage and networking infrastructure, and improving performance of the business applications within their business location. For this purpose, wireless network systems that make effective use of the spectrum within a business enterprise for wireless communication, improve the efficiency of communication within the organization and between the organization and the external entities. This improved communication capability at the enterprise location increases business efficiency and reduces cost. Business use cases include: fixed wireless internet service; in building private enterprise network service; mobile broadband networks; industrial IoT; educational IoT; health IoT; communications within public venues (sports stadiums, airports, shopping malls, hotels, etc.), neutral host, etc.

FIG. 1 is an illustration of a basic configuration for a communication network 100, such as a "4G LTE" (fourth generation Long-Term Evolution) or "5G NW" (fifth generation New Radio) network. Through this network configuration, user equipment (UE) 101 (such as UE 101a, UE 101b, UE 101c, and UE 101d) can connect to External Packet Data Networks (PDNs) via a plurality of BS/AP base stations (such as BS/AP 109) and access any of a variety of services such as the Internet 107, Application Servers, Data Services, Voice Services, and others.

UEs

As used herein, the term "UE" refers to a wide range of user devices having wireless connectivity, such as a cellular mobile phone, an Internet of Things (TOT) device, virtual reality goggles, robotic devices, autonomous driving machines, smart barcode scanners, and communications equipment including for example cell phones, desktop computers, laptop computers, tablets and other types of personal communications devices. In some cases, the UEs may be mobile; in other cases, they may be installed at a fixed location. For example, a factory sensor may be installed at a fixed location from which it can remotely monitor an assembly line or a robotic arm's movement. In the illustration of the communication network 100 of FIG. 1, the UEs 101 include a first mobile phone 101a, a second mobile phone 101b, a laptop computer 101c, and a printer 101d.

In some embodiments, the UEs 101 connect wirelessly over communication links 105 to a Radio Access Network (RAN) that includes at least one base station/access point (BS/AP) 109 and a Core Network 114. One of the advantages of such networks 100 is their ability to provide communications to and from the multiple UEs 101 and provide these wireless UEs 101 with access to a large number of other devices and services, even though the devices may be mobile and may be moving from location to location.

BS/APs

The term 'BS/AP' is used broadly herein to include base stations and access points, including at least an evolved NodeB (eNB) of an LTE network or gNodeB of a 5G network, a cellular base station (BS), a Citizens Broadband Radio Service Device (CBSD) (which may be an LTE or 5G device), a Wi-Fi access node, a Local Area Network (LAN) access point, a Wide Area Network (WAN) access point, and should also be understood to include other network receiving hubs that provide access to the network 100 of a plurality of wireless transceivers within range of the BS/AP 109. Typically, the BS/APs 109 are used as transceiver hubs, whereas the UEs 101 are used for point-to-point communication and are not used as hubs. Therefore, the BS/APs 109 transmit at relatively higher power levels than do the UEs 101.

CBRS Networks

Another type of wireless networks that recently became available for general use by enterprises at their enterprise locations is a Citizen's Broadband Radio Service (CBRS), also referred to herein as Citizen Band Radio Service (CBRS) networks. These CBRS networks utilize the CBRS radio band of 3550-3700 MHz (which is 150 MHz of CBRS frequency spectrum), nominally divided into fifteen frequency channels of 10 MHz each. Particularly, the FCC recently approved use of the CBRS Radio band of the frequency spectrum and finalized rules (Rule 96) that allow general access to the CBRS Radio band. The CBRS rules set forth therein detail requirements for the devices that operate in a CBRS network and dictate how they communicate with each other. CBRS supports both LTE and 5G devices.

FIG. 2 is a diagram of a wireless communication network that may be implemented as an Enterprise Network 250 using a CBRS network. A plurality of BS/APs 202a, 202b, 202c, and 202d are deployed in an enterprise location 200. It should be noted that throughout this disclosure, a reference string (such as "202a") used to identify a feature in a figure, having a string of numeric characters followed by one or more alphabetic characters, identifies a feature of the figure that is similar to other features in the figures having the same numeric string of characters. For example, the BS/AP 202a is similar in terms of functionality and performance to the BS/AP 202b, 202c and 202d. Furthermore, a reference string having only the numeric string (i.e., lacking the alphabetic characters) refers collectively to all of the features having the same numeric string. For example, the BS/AP 202 refers collectively to all four of the BS/APs 202a, 202b, 202c and 202d.

In FIG. 2, each BS/AP 202 has a range, defining a wireless coverage area or "Radio Footprint". The BS/APs 202 may comprise CBSDs in a CBRS system. A first UE 201a is wirelessly connected to a first BS/AP 202a, which is providing service to it. A second UE 201b is wirelessly connected to a second BS/AP 202b, and is providing service to the second UE 201b. Other UEs 201, which connect wirelessly to the BS/APs 202, are shown in the enterprise location 200. All of the BS/APs 202 are connected to a PDN 220 by any appropriate communication means, such as wire, fiber optic, and wireless radio. The PDN 220 provides a connection to an operator network 222 that includes an Oracle (OAM) Server 207, a SON assist unit 208, a Domain Proxy 209, an Automatic Configuration Server (ACS) 210 and a Location Database 211, all of which are connected to each other within the operator network 222 by any appropriate communication means. An MNO network may be connected to a Spectrum Access System (SAS) 212, which is connected to a Spectrum Database 213 that includes data regarding the CBRS spectrum that the SAS 212 manages. Collectively, the SAS 212 and the Spectrum Database 213 are referred to as a Spectrum Management Entity (SME) 214. As is well known, the SAS 212 is typically a cloud-based service that manages the wireless communications of devices transmitting in the CBRS band, in order to prevent harmful interference to higher priority CBRS users. A CBRS device (CBSD) needs authorization from the SAS 212 before it begins transmissions in the CBRS band.

In some of the literature, the BS/APs 202 within a CBRS network are termed "CBSDs", and the UEs 201 are termed End User Devices (EUDs). CBSDs are fixed Stations, or networks of such stations, that operate on a Priority Access License (PAL) or General Authorized Access (or sometimes referred to as "General Availability Access") (GAA) basis within the CBRS band consistent with Title 47 CFR Part 96 of the United States Code of Federal Regulations (CFR) (hereafter "Part 96" or "the Part 96 rules"). Title 47 CFR Part 96 of the United States Code of Federal Regulations (CFR) (or Part 96) is hereby incorporated by reference herein as if set forth in its entirety. The Priority Access tier consists of Priority Access Licenses (PALs) that are licensed on a county-by-county basis through competitive bidding. Each PAL consists of 10 megahertz channels within the 3550-3650 MHz CBRS band, however, as described below, the PALs may be grouped together into greater CBRS bandwidth groups in accordance with the presently disclosed methods and apparatus. Currently, up to four (4) BW groupings for the PALs may be possible. PALs are 10-year renewable licenses. For purposes of the PAL service, counties are defined using the United States Census Bureau's 2017 counties. Up to seven PALs may be licensed in any given county, subject to a four (4) PAL channel aggregation cap for any licensee. PALs must meet a substantial performance requirement by the end of the initial license term. PALs must protect and accept interference from Incumbent Access users (higher tier users) but receive protection from General Authorized Access users (lower tier uses). Technical rules for PALs can be found in Subpart E of the above-incorporated Part 96.

The GAA tier is licensed-by-rule to permit open, flexible access to the 150 MHz CBRS frequency band for the widest possible group of potential GAA users. GAA users can operate throughout the 3550-3700 MHz CBRS band. The GAA tier is the lowest of the three CBRS 150 MHz bandwidth tiers. The GAA devices are dynamically allocated bands within the 100 MHz frequency channels within the CBRS frequency spectrum (i.e., within the 3500-3700 MHz CBRS frequency spectrum). However, the GAA devices must yield their frequency band allocation to PAL and higher tiered devices. The idea is that GAA bandwidth is allocated dynamically, so that it does not interfere with the "Incumbent" (highest tier) or PAL-tiered (next highest tiered) devices. In other words, the GAA devices use the available spectrum that is not occupied by higher tiered devices.

The CBRS rules require that a SAS (such as the SAS 212 of FIG. 2) allocate spectrum to the CBSDs to avoid interference within the CBRS band. The SAS 212 is a service that manages the spectrum used in wireless communications of devices transmitting in the CBRS band in order to prevent harmful interference to higher priority users such as the military and priority licensees. As noted above, a CBRS device, such as a CBSD, needs authorization from the SAS 212 before beginning to transmit in the CBRS band. Even after receiving authorization to transmit in the CBRS band, the SAS 212 may suspend or terminate authorization of one or more of the channels previously authorized by it.

PAL CBSDs (i.e., CBSDs that operate under a PAL license) have higher priority to access the available CBRS spectrum than do GAA CBSDs (i.e., CBSDs that operated under a GAA). GAA CBSDs use the available CBRS bandwidth opportunistically. PAL CBSDs are indicated as having a higher tier usage as compared to GAA CBSD usage for channel allocation. However, this does not necessarily mean that priority is given to PAL CBSDs over GAA CBSDs for all aspects of the channel usage. In some cases, it would be desirable to allow CBRS spectrum to be shared in a fair and equitable manner, since the philosophical basis for CBRS generally is to share the spectrum fairly and equally.

Therefore, it is important to make TDD (Time Division Duplex) Configuration selections fairly for both the GAA CBSDs and the PAL CBSDs within the CBRS.

TDD Configurations—Defined—Potential Problems in Current CBRS Systems

One problem that can arise with regard to assigning spectrum in the CBRS network is that the Time Division Duplex (hereafter "TDD") Configuration that is used by a particular CBSD should be the same across the spectrum. As defined in the CBRS Coexistence Technical Specifications, CBRSA-TS-2001, V 4.0.0, published Apr. 15, 2021 (hereafter the "Coexistence Specifications"), which Coexistence Specifications are hereby incorporated by reference herein as if set forth in full, it is well understood in the industry that a desirable condition for multiple overlapping outdoor LTE-TDD and NR-TDD deployments to coexist in the same band is that they align their frame boundaries and use the same TDD Configuration. Asynchronous operation in the same outdoor area can lead to detrimental interference conditions, and coexistence solutions without alignment of cell phases and TDD Configurations may not be practical and/or efficient.

As used herein, a communication "channel" comprises a radio frequency, or more precisely, a bandwidth allocated on a specific radio frequency. As noted above, a CBRS network specifies 15 (fifteen) communication channels, each channel comprising 10 MHz of bandwidth, wherein the CBRS network uses 150 MHz of bandwidth spectrum, starting from 3.55 GHz and extending to 3.7 GHz. The present methods and apparatus are directed toward managing the bandwidth spectrum allocation and the TDD channel configuration on each of the CBRS channels. As noted above, cross-channel interference can occur based upon the TDD channel configuration that is selected within the CBRS network between adjoining channels within the CBRS network. It is typically estimated that a given channel can cause interference within 40 MHz of its frequency operation in adjoining channels. However, based upon real-world data, it appears that, in use, the neighboring channels are not as negatively impacted by a single frequency's choice of TDD configuration.

FIGS. 3A and 3B show LTE TDD frame structures (300 and 320, respectively) used by the CBRS networks and CBSDs operating within those networks, as described above with reference to FIGS. 1 and 2. FIG. 3A shows an LTE TDD 10 ms. frame 300 using ten (10) 1 ms. subframes for use as Uplink (U), Downlink (D) and switching subframes. FIG. 3B shows a graphical view 320 of the 10 ms. LTE TDD frame 300 of FIG. 3A. As shown in FIG. 3A and FIG. 3B, in some embodiments, a TDD configuration comprises 10 ms. TDD frames including ten (10) 1 ms. subframes designated for uplink (U) use (from the UE to the BS/AP), downlink (D) use (from the BS/AP to the UE), and "switching" subframes designated as Special Switching Format or Special Subframe Switching Format (hereafter "SSF") subframes. The subframe numbers are set forth in the LTE TDD 10 ms. frame 300 of FIG. 3A and are sequentially numbered from subframe number 0 (301*a*), extending to, and including subframe number 9 (301*j*)). Specifically, and referring again to FIG. 3A, the 10 ms. TDD frame 300 includes: subframe number "0" 301*a*, subframe number "1" 301*b*, subframe number "2" 301*c*, subframe number "3" 301*d*, subframe number "4" 301*e*, subframe number "5" 301*f*, subframe number "6" 301*g*, subframe number "7" 301*h*, subframe number "8" 301*i*, and subframe number "9" 301*j*; wherein each subframe of the TDD frame 300 is 1 ms. in duration.

As described in more detail below with reference to FIGS. 3C and 3D, the SSF subframes are shown as "S" in FIG. 3A and as "SSF" in FIG. 3B, and each SSF subframe has constituent subframe sub-timeslots (or OFDM symbols) (comprising Uplink Pilot subframe sub-timeslots, Downlink Pilot Time subframe sub-timeslots and Guard Periods (GPs) subframe sub-timeslots. The SSF subframes of FIGS. 3A and 3B are used and designated whenever the CBSD change from a Downlink (D) subframe transmission to an uplink (U) subframe transmission. The SSF subframes are not required when switching from Uplink to Downlink communications in a channel.

The SSF subframes (such as that shown in subframe number 1 301*b* of TDD frame 300, in config. #s 0-6 304*a*-304*g*, inclusive) are required because the downlink transmissions have much greater power than do the uplink (U) transmissions. The UE communications power levels are typically much less than those transmitted in the downlink by the BS/APs. The SSF subframes are required to avoid interference caused by the downlink transmissions to the uplink transmissions. The SSF subframes avoid the uplink transmissions from being overlapped or "drowned out" by the downlink transmissions. In this sense the SSF subframes serve as guard bands when switching from D subframes (Downlink transmissions) to U subframes (Uplink transmissions). Note that 5G-NR ("New Radio") subframe TDD configurations are somewhat more flexible. 5G-NR subframe TDD configurations can be dynamically assigned, and the U, D and SSF subframes can be dynamically assigned.

FIGS. 3A and 3B show the LTE TDD frame configuration formats used in practicing the present methods and apparatus. The LTE Frames 300, 320 comprise 10 ms. total, divided into 1 ms. subframes organized as subframe #0 through subframe #9 as described above. Additionally, as shown in FIG. 3A, seven separate and distinct TDD Configuration formats (organized as TDD configuration number "0" 304*a* through and including TDD configuration "6" 304*g*) are available to be used by the CBSDs. Each TDD Configuration number (or "TDD config. #) has associated and corresponding allocation of subframes having differing U, D, and SSF subframe numbers and allocations. Some of the TDD config. #s are downlink centric, some are uplink centric, and some are evenly balanced between uplink and downlink transmissions.

In some types of operation, CBSDs (or BS/APs operating in a CBRS network such as the BS/APs 109 of FIG. 1 and the BS/APs 202 of FIG. 2) may opt for selecting any of the TDD config #s shown in FIGS. 3A and 3B. For example, a specific first CBSD may choose a first TDD config. #1 (304*b*), and another, second CBSD, that operates on the same channel as the first CBSD, may choose a second TDD config. #2 (304*c*). As shown in FIG. 3A, when operating in accordance with the first TDD config. #1 (304*b*), for each 10 ms. frame, there are four (4) downlink subframes and four (4) uplink subframes, with two (2) SSF subframes separating the downlink subframes from the uplink subframes, per 10 ms. frame 300, 320. When operating in accordance with the second TDD config. #2 (304*c*), there are six (6) downlink subframes, two (2) uplink subframes, and two (2) SSF subframes separating the downlink subframes from the uplink subframes. The TDD config. #1 304*b* is more evenly balanced between and uplink and downlink subframes (4 uplink subframes and 4 downlink subframes), than is the TDD config. #2 304*c* which is more downlink centric (comprising 6 downlink subframes and only 2 uplink subframes per 10 ms. TDD frame 300).

The different TDD Configurations are used to address different use cases. For example, some CBSDs use uplink centric TDD configurations (such as TDD config. #0 (304a)) to allow more traffic in the uplink from the UEs to the CBSDs (or BS/APs 202). This type of TDD configuration would be used, for example, if one of the use cases had a plurality of cameras having video data to be transmitted on the uplink to a monitor, for example. Alternatively, if web browsing were demanded by a number of UEs connected to a specific CBSD (or BS/AP, such as the BS/AP 202a of FIG. 2), then that CBSD would request to use a downlink centric TDD config. # such as TDD config. #5 (304f) as shown in FIGS. 3A and 3B. The type of TDD configurations and TDD config. #s requested for use by the CBSDs are typically determined by each of the CBSDs depending on the desired network use cases served by each CBSD. The actual TDD selection however, is determined by the SAS 212 and a Coexistence Manager (CxM) 406 (see FIG. 4). The SAS 212 and Coexistence Manager (CxM) 406 functionality and use in selecting the TDD Configuration is described in detail below with reference to FIGS. 4-7.

When accessing data from an MNO using the CBRS network, TDD configurations tend to be downlink centric due to the nature of data accessed by typical UEs. UEs tend to consume much more data and information on the downlink (from the BS/APs 202 to the UEs 201) than they produce on the uplink (from the UEs 201 to the BS/APs 202).

The prior art approach for selecting the correct TDD configurations for the CBSDs (or BS/APs 202) has been to require a single TDD configuration (for example, TDD config. #1 304b TDD config. #2 304c, and so on) to be used across the full 150 MHz CBRS band for CBSDs within a given TCCS (TDD Configuration Connected Set). TDD Configuration Connected Sets (TCCS) are determined by the SAS (such as the SAS 212 of FIG. 2 and, more accurately, by the CSAS 408 of FIG. 4), The TCCS is based on the physical proximity and radio transmission "footprints" of the plurality of CBSDs 202 operating within a given CBRS network)(such as, for example, the CBRS Enterprise Network 250 of FIG. 2. A TDD Configuration connected set (TCCS) is assigned to a selected plurality of CBSDs and is determined for CBSDs that are located sufficiently proximate each other to negatively impact the operation and transmissions produced by those CBSDs. Such CBSDs are assigned to a selected one TCCS.

For example, if the radio footprint of a CBSD A overlaps that of a CBSD B, then both of the CBSDs A and B are assigned to the same TCCS. Furthermore, if CBSD A's radio footprint does not overlap CBSD B's radio footprint, but both CBSD A's and CBSD B's radio footprints overlap a third CBSD C's radio footprint, all three CBSDs (A, B and C) are assigned to and become one of the same TCCS. The TCCS connected set is determined by the proximity of CBSDs to each other and their transmission power, which determines the radio "footprints" generated by the CBSDs. Those CBSDs that overlap each other, or that overlap a third CBSD that overlaps the two CBSDs A and CBSD B, are all assigned to a given one TCCS. As noted above, the TCCS designations are performed by the SAS 212, and more specifically by the CSAS 408 (FIG. 4) described in more detail below with reference to FIG. 4.

The TCCS is similar to the Channel Assignment Connected Sets built by forming edges between CBSDs that have overlap of their respective 96 dBm/10 MHz contours. Because GAA and PAL CBSDs use the same spectrum at different times, the TDD configuration of the spectrum also needed to be the same for both GAA and PAL CBSDs. This was because a PAL CBSD may want to opportunistically acquire a GAA channel for its use. Currently, the channel allocation policies for GAA are not clearly defined. The manner in which allocations will be made fairly for a new deployment entering an established market is also not yet established.

The cardinality of indoor CBSDs will likely be an order of magnitude larger than that for outdoor CBSDs. A clear understanding of the TCCS (TDD Configuration Connected Set) geographic sizing and the typical voting structure will need to be determined. For indoor deployments, where the CBSD power levels are comparable to UE power levels, the restriction on utilizing the same TDD Configuration can be relaxed.

A PAL purchase of 10 MHz should not force a downlink centric preference to be imposed on the entirety of the CBRS band. A TDD configuration selection in which there is one for PAL CBSDs and another for GAA CBSDs may well not be agreeable to the PAL CBSD entities, given that they may want to opportunistically use GAA channels when the GAA channels are available to them. Furthermore, CBSDs cannot support two TDD configurations on the same CBSD. Of the available 150 MHz of CBRS spectrum, 70 MHz has been auctioned and purchased by PAL entities. PAL channel allocations can be in any band of 100 MHz of the CBRS band, and the top 50 MHz are reserved for GAA usage, although GAA CBSDs can use up to 100 MHz of the total 150 MHz of the CBRS spectrum if it is elsewise not already used by a PAL or higher tier device.

For enterprise deployment scenarios, it is not uncommon for a request to be made for TDD config. #s 0, 1, 2, 4, and 5 (see FIGS. 3A and 3B). As shown in FIGS. 3A and 3B, there are uplink implications resulting from selecting TDD config. #s 2, 4 and 5 when used in enterprise network (or CBRS network) deployments. As an example, typically, enterprise network deployments desire to use an uplink/downlink balanced TDD configuration such as the TDD config. #1 304b shown in FIGS. 3A and 3B. PAL CBSDs tend to want to use TDD config. #2 304c (i.e., more downlink centric TDD configurations). However, as shown in FIG. 3A, the PAL CBSDs using TDD config. #2 304c allocate subframe numbers 3 301d and 8 301i for Downlink subframe transmissions, while the GAA CBSDs using TDD config. #1 304b allocate subframe numbers 3 and 8 for Uplink subframe transmissions. Therefore, the Downlink subframe transmissions produced by a PAL CBSD (typically used in an outdoor deployment) using TD config. #2 304c will cause interference to the GAA CBSDs Uplink transmissions in subframe numbers 3 (301d) and 8 (301i) because the Downlink subframe transmissions are much more powerful than are the Uplink subframe transmissions. Similar (and possibly worse) uplink transmission interference can be caused by PAL CBSDs using TDD config #4 (304e), and TDD config. #5 (304f) when the GAA CBSDs uses its preferred TDD config. #1 (304b).

Regardless of complexities, the CBRS band provides an opportunity to create new wireless networks, and there is a desire for utilizing and making maximum use of spectrum in the CBRS band while following the rules pertaining to the CBRS usage, including effectively responding to directions from the SAS 212.

Furthermore, a current procedure promulgated by the CBRS Alliance determines what happens when TDD configurations proposed by different CBSDs in a TCCS differs (i.e., either the TDD config. #s or the SSF config. #s within the TCCS differ in the proposed TDD configurations). In accordance with the CBRS Alliance procedure, the CSAS 408 resorts to a voting procedure with a fallback TDD configuration, which forces the procedures into the fallback mode. Similar issues can also arise with the TDD configuration suggested by the CBSDs in the fallback TDD configuration.

Accordingly, it is advantageous to provide methods and apparatus that allocate bandwidth and select the TDD configuration in a manner that allows maximum cooperation between GAA and PAL CBSDs, and that include procedures that avoid forcing the procedures into a fallback mode whenever a TDD configuration mismatch occurs. It is desirable to provide methods and apparatus that allocate an appropriate TDD configuration across all of the CBSDs (BS/APs) in the CBRS network so that there is minimal interreference between the CBSDs and so that there is uniform usage of the bandwidth in terms of use cases across all of the CBSDs in a given CBRS network. Methods and apparatus are desired that determine how to select the correct TDD configurations for the CBSDs (or BS/APs) based on the constitution of the CBSDs and taking the GAA and PAL CBSDs requirements into account. It is desirable to have methods of biasing the behavior of the CBSDs TDD configurations based on the purchase of the channels made by the PAL CBSDs and PAL entities so that the PAL CBSDs obtain a higher weight during the selection of the correct TDD configurations. The methods should also account for voting so that correct TDD configurations are selected.

The presently disclosed methods and apparatus for Time Division Duplex (TDD) Configuration Selection for CBRS operation with TDD Configuration Mismatch provide such desired methods and apparatus.

BRIEF DESCRIPTION OF THE DRAWINGS

The disclosed methods and apparatus, in accordance with one or more various embodiments, is described with reference to the following figures. The drawings are provided for purposes of illustration only and merely depict examples of some embodiments of the disclosed methods and apparatus. These drawings are provided to facilitate the reader's understanding of the disclosed methods and apparatus. They should not be considered to limit the breadth, scope, or applicability of the claimed invention. It should be noted that for clarity and ease of illustration these drawings are not necessarily made to scale.

FIG. 3A shows an LTE TDD frame having ten (10) 1 ms. subframes for use as Uplink (U) subframe transmissions, Downlink (D) subframe transmissions, and switching subframes (SSF).

FIG. 3C shows details of the Special Switching Format (SSF) subframe used in the TDD frames of FIGS. 3A and 3B, wherein the SSF subframe has ten (10) associated configuration numbers that determine the number of Uplink Pilot subframe sub-timeslots, Downlink Pilot Time subframes sub-timeslots and Guard Period (GPs) subframe sub-timeslots used by a given SSF subframe configuration.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Figure 1:
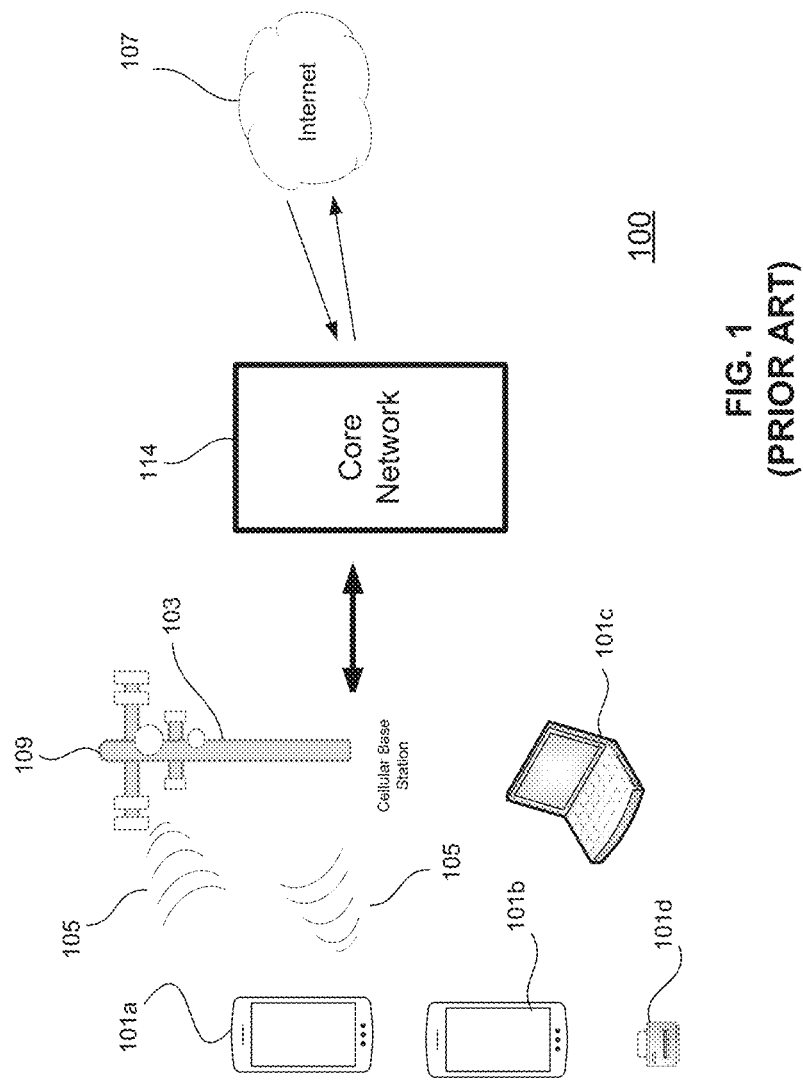
FIG. 1 is an illustration of a basic configuration of a communication network, such as a fourth generation Long-Term Evolution or fifth generation New Radio network.
Figure 2:
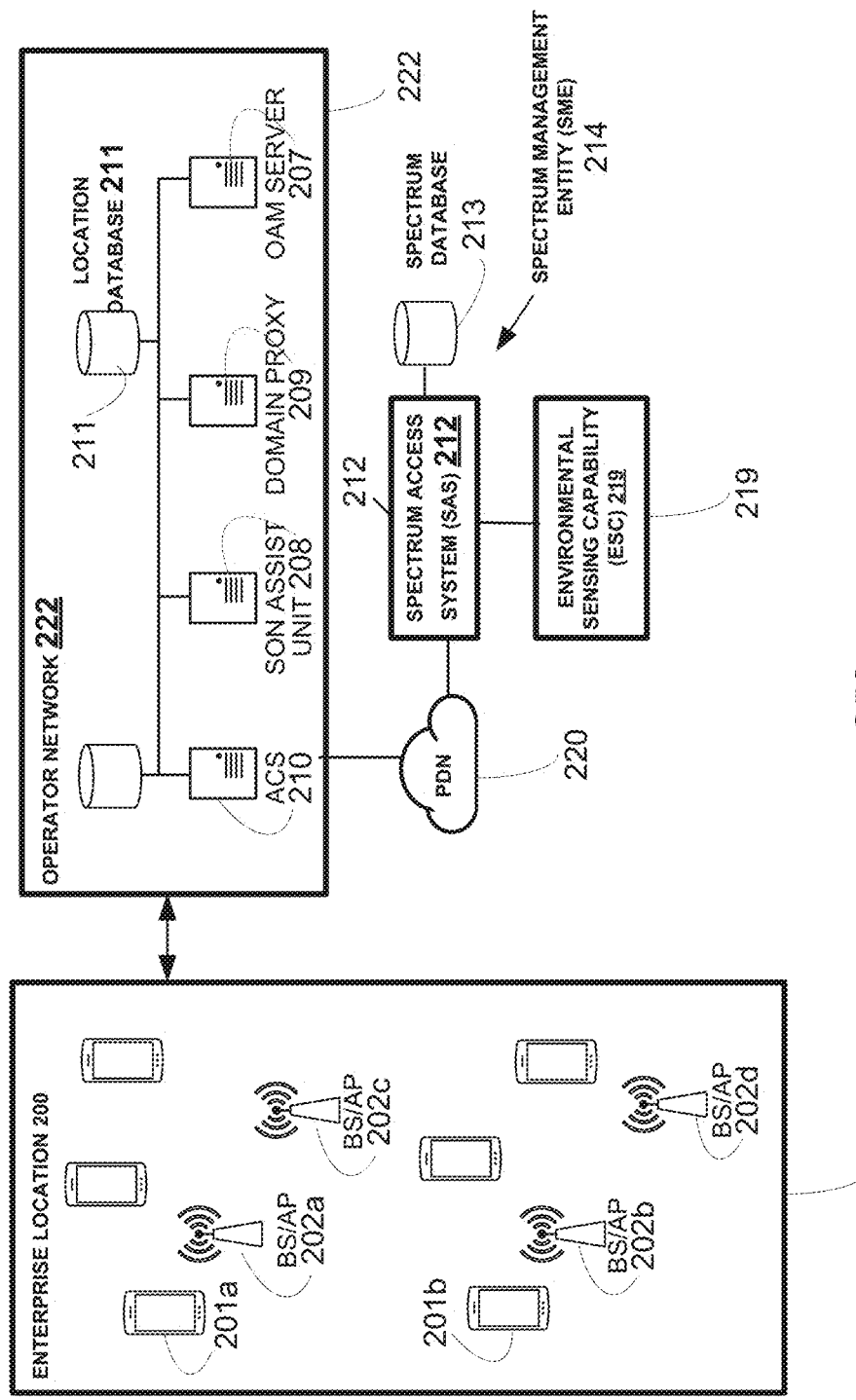
FIG. 2 is a diagram of a wireless communication network implemented as an Enterprise Network using a CBRS system.
Figure 3B:
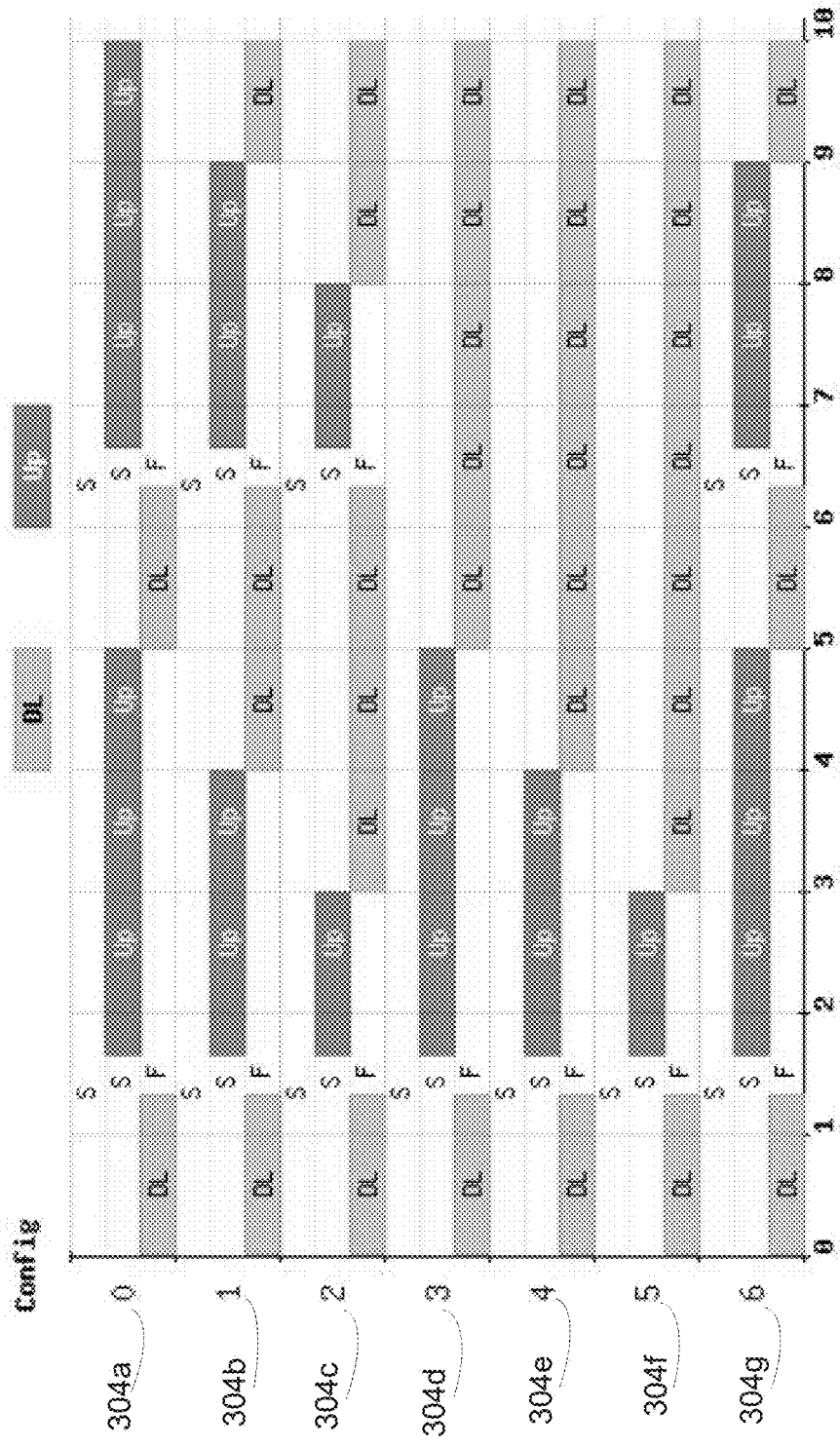
FIG. 3B shows a graphical view of the LTE TDD frame shown in FIG. 3A.

The disclosed methods and apparatus provide for capacity and effective use of shared spectrum in a CBRS network in which there may be downlink (DL) centric and uplink (UL) centric capacity requirements and use cases for the different entities. FIG. 3A shows an LTE TDD frame structure used in CBRS networks such as those described above with reference to FIGS. 1 and 2. Referring again to FIGS. 3A and 3B, uplink centric CBSDs (such as GAA CBSDs used in Enterprise Networks or CBRS networks) typically used TDD config. #s 0 (304a) or 1 (304b). Downlink centric CBSDs typically use TDD config. #2 (304c). The disclosed method and apparatus accommodate both downlink centric and uplink centric CBSDs to co-exist within the 150 MHz CBRS frequency band.

Figure 4:
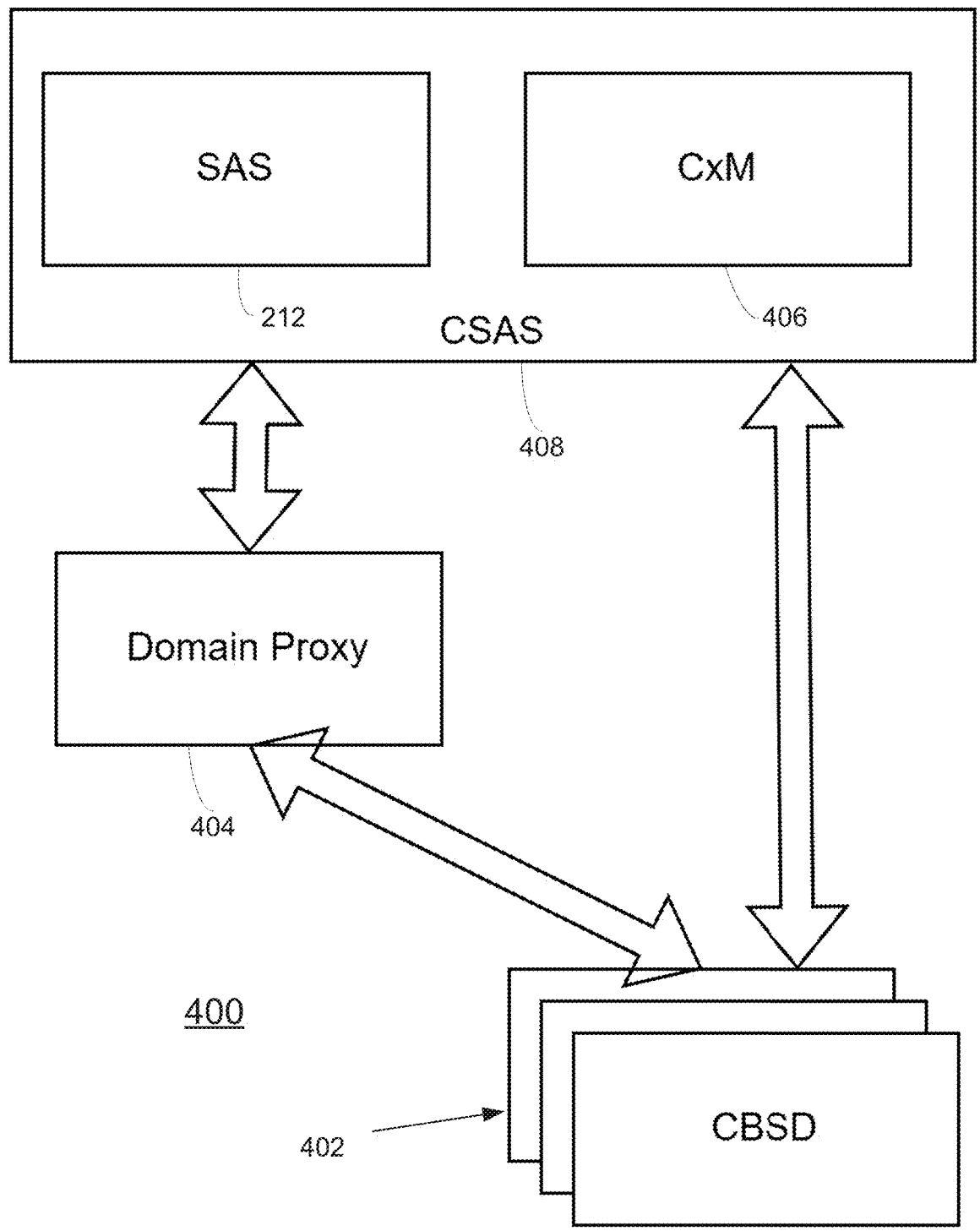
FIG. 4 shows a simplified block diagram of an apparatus for Time Division Duplex (TDD) Configuration Selection for Citizen Band Radio Service (CBRS) Operation with TDD Configuration Mismatch in accordance with the present disclosure.

FIG. 4 shows an exemplary embodiment of an apparatus 400 implementing Time Division Duplex (TDD) Configuration Selection for Citizen Band Radio Service (CBRS) Operation with TDD Configuration Mismatch in accordance with the present disclosure. As shown in FIG. 4, in some exemplary embodiments, the TDD Configuration Selection apparatus 400 comprises a plurality of CBSDs 402, wherein the plurality of CBSDs 402 are in communication with a Domain Proxy (DP) 404, which, in turn, is in communication with a "CSAS" 408. In some embodiments, as shown in FIG. 4, the CSAS 408 comprises an SAS 212 (such as the SAS 212 shown in FIG. 2 and described in detail hereinabove) and a Coexistence Manager (CxM) 406. As noted above, the SAS 212 manages the wireless communications of devices transmitting in the CBRS band, in order to prevent harmful interference to higher priority (i.e., higher tiered) users. As noted above, a selected CBRS device (such as a selected CBSD of the plurality of CBSDs 402) requires authorization from the SAS 212 before it can begin to transmit in the CBRS band controlled by the CSAS 408. The Domain Proxy (DP) 404 is an entity engaging in communications with the SAS 212 or CSAS 408 on behalf of the plurality of CBSDs 402 (or networks of CBSDs 402). The Domain Proxy 404 provides a translational capability to interface legacy radio equipment in the 3650-3700 MHz CBRS band with a SAS 212 and thereby ensures compliance with the above-incorporated Part 96 rules.

The Coexistence Manager (CxM) 406 is responsible for assigning a pool of available CBRS spectrum, received from the CSAS 408 for the plurality of CBSDs 402 in a given TCCS. As noted above, the SAS 212 TDD Configuration Connected Sets (TCCS) are determined by the SAS (such as the SAS 212 of FIGS. 2 and 4), and more accurately, by the CSAS 408 (FIG. 4) comprising both the SAS 212 and the CxM 406 as shown in FIG. 4.

In accordance with the above-incorporated Coexistence Specifications, the CSAS 408 is responsible for providing the Coexistence Group (CxG) of CBSDs (such as the plurality of CBSDs 402 of FIG. 4) with a frequency spectrum assignment that is meant to be distributed among the plurality of CBSDs 402. In particular, the CSAS 408 shall identify one or more sets of CBSDs within the plurality of CBSDs 402 and shall provide the CxM 406 with a spectrum assignment for each set. The CxM 406 shall perform primary channel assignment consistent with the operation of the CBSDs 402. The CxM 406 is responsible for informing the serving CSAS 408 regarding the GAA Channel Assignments. Coordination of CBRS spectrum use between the plurality of CBSDs 402 is facilitated by exchanging information between the CBSDs 402 belonging to the same TCCS and the CxM 406. The TDD Configuration Selection methods and apparatus using the apparatus 400 of FIG. 4 is described in more detail below with reference to FIGS. 5-7, inclusive.

SSF Subframes—Ten (10) Different SSF Subframe Types/Configurations

Figure 3D:
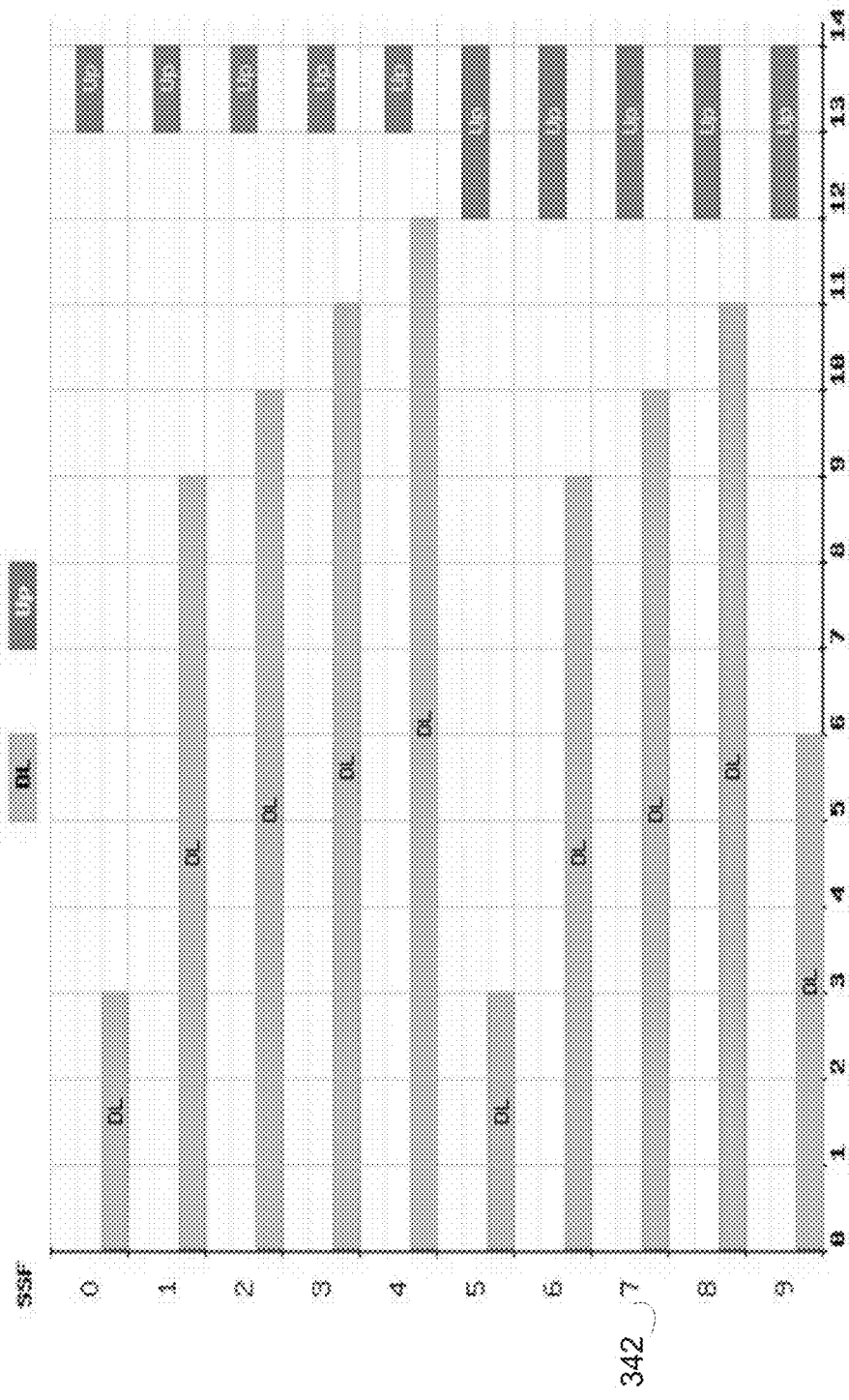
FIG. 3D shows a graphical view of the SSF subframe of FIG. 3C.

In order to more precisely describe the present TDD Configuration Selection methods and apparatus, it is helpful to describe details of the SSF "Special" Subframes shown in FIGS. 3C and 3D. As shown in FIGS. 3C and 3D, the SSFs described above with reference to FIGS. 3A and 3B have several different types or SSF "configurations". Ten (10) different SSF types or "configurations" are shown in FIGS. 3C and 3D, numbered SSF config #s 0-9. CBRS networks use LTE Orthogonal Frequency Division Multiplexing (OFDM) waveforms for transmission. Each 1 ms. subframe (as shown and described above with reference to FIGS. 3A and 3B), themselves comprise fourteen (14) OFDM time symbols (as described below and shown in more detail in FIG. 3D) or "subframe sub-timeslots). More specifically, all of the D, U and SSF 1 ms. subframes (described above with reference to FIGS. 3A and 3B) each comprise fourteen (14) OFDM time symbols or "subframe sub-timeslots". Just as an aside, a set of symbols together with a set of frequencies, taken together, form what is referred to in the art as PRB (Prioritized Resource Block) entities. This is what is being scheduled at any point in time.

As shown in FIG. 3D, no matter what the SSF configuration # that is used (0-9), each SSF subframe begins with a specified number of Downlink (DL) OFDM symbols (subframe sub-timeslots) (3 DL symbols for SSF config. #0, 9 DL symbols for SSF config. #1, and 10 DL symbols for SSF config. #2, etc.). The DL symbols (or subframe sub-timeslots) are "front loaded" within each type of SSF subframe because, as described above, the SSF subframes always follow a Downlink subframe and is placed between a Downlink 1 ms. subframe and an Uplink 1 ms. subframe. The SSF subframe serves as a guard band between the Downlink subframes and the Uplink subframes. It should be noted when reviewing FIGS. 3C and 3D that not all of the 14 OFDM time symbols (subframe sub-timeslots) within any given SSF subframe (using any one of the SSF configuration #s (SSF config. #s 0-9)) are used as "Guard Period" time symbols (subframe sub-timeslots). Some of the OFDM symbols can be used as Downlink Pilot Time Symbols (subframe sub-timeslots) (for example, 3 for SSF config. #0, 9 for SSF config. #1, and 10 for SSF config. #2, etc., as shown in FIGS. 3C and 3D). Some of the OFDM time symbols (subframe sub-timeslots) can be used as Uplink Pilot Time Symbols (for example, 1 Uplink Pilot time symbol for SSF config. #0, 1 for SSF config. #1, 1 for SSF config. #2, etc., as shown in FIGS. 3C and 3D). Finally, some of the OFDM time symbols (subframe sub-timeslots) can be used as Guard Period Time Symbols (for example, 10 GP time symbols for SSF config. #0, 4 GP time symbols for SSF config. #1, and 3 GP OFDM time symbols for SSF config. #2, etc.). As shown in FIG. 3D, no matter what the SSF config. # is, the Uplink Pilot Time Symbols for all of the SSF config. #s occur at the end of the 14 symbol SSF subframe sub-timeslots. That is, the Uplink Pilot time symbols (or Uplink subframe sub-timeslots) of the SSFs "merge" into the next Uplink subframe of the TDD frames 300, 320, as indicated in the subframe numbers (0-9) of FIGS. 3A and 3B.

In addition to aligning TDD configurations of CBSDs within selected TCCSs, the present methods and apparatus ensure that the SSF config #s are also properly aligned. More specifically, the present methods and apparatus align the Downlink and Uplink Pilot Time Symbols (subframe sub-timeslots) (as dictated by the SSF config. #s) properly in all of the CBSDs within a TCCS. Both the TDD config. #s and the SSF config. #s must match for all CBSDs within a selected TCCS.

Aligning SSF for TDD Configurations Prior to Fallback in Accordance with the Present Methods and Apparatus The prior art procedures, per the Citizens Band Radio Service Alliance (CBRSA), and pursuant to the above-incorporated "Coexistence Specifications", require that when the TDD Configuration (including both the TDD configuration number and the SSF config. #) is requested by different CBSDs (such as, for example, the CBSDs 402 of FIG. 4) within a selected TCCS, the CSAS (such as the CSAS 408 of FIG. 4) must resort to a voting procedure using a fallback TDD configuration number. This forces the procedures into the fallback mode even for scenarios where the only mismatch in TDD configurations is the SSF config. #. That is, even when the CBSDs 402 request the same TDD Configuration, but only differ in the SSF config. #s requested by the CBSDs 402, the above-incorporated Coexistence Specifications require that a voting procedure be implemented using a fallback TDD config. #. This is inefficient, unnecessary, and unfair. The presently disclosed TDD Configuration Selection methods and apparatus address these deficiencies.

In accordance with the present methods and apparatus, in such a scenario where one or more CBSDs 402 in a TCCS request the same TDD Configuration number and only differ with regard to the requested SSF config. #s, a voting procedure is used in accordance with the incorporated Coexistence Specifications, but the voting procedure is applied to and is only used to determine the SSF config. # to be used by the CBSDs. The TDD Configuration number requested by the CBSDs 402 (within the same TCCS) is not changed by this voting method from what is requested by the CBSDs 402. This method is based on CBSDs 402 in the TCCS requesting the same TDD config # but differing only in the SSF config. #s that the CBSDs 402 desire. A majority of the CBSDs requesting different SSF config. #s are used and recommended to the CBSDs/DP ("Domain Proxy", such as the Domain Proxy 404 shown in FIG. 4) in a response to a message from the CSAS 408. In some embodiments of the present methods and apparatus, a simple majority voting procedure is performed. However, importantly it is performed only on the SSF config. #s requested by the CBSDs in the TCCS.

In some embodiments of the present methods and apparatus, a fallback procedure uses the SSF config. #7 (342 in both FIGS. 3C and 3D) as the SSF config. # that is selected by the CSAS 408 and applied to the CBSDs' 402 TDD Configuration and included SSF config. #. The fallback procedure also forces the CBSDs 402 within a TCCS to use either TDD config. #1 (304b in FIGS. 3A and 3B) or TDD config. #2 (304c in FIGS. 3A and 3B). In accordance with the CBRSA standards and the incorporated Coexistence Specifications, each CBSD 402 within a TCCS indicates or requests its fallback TDD Configuration number as being TDD Config. #1 (304b) or TDD Config. #2 (304c). These indicated or requested TDD Config. # fallback numbers are used when voting for the TDD Config. # that is assigned to the CBSDs 402 within a selected TCCS. In accordance with some embodiments of the present methods and apparatus, a simple majority vote is used to make this TDD Configuration Selection determination and to assign the enforced TDD configuration numbers on the CBSDs 402 within the selected TCCS. Note that different voting approaches are possible both for the PAL CBSDs and the GAA CBSDs, and also for CAT-A and CAT-B CBSDs. Note that those of ordinary skill in the wireless communications art shall appreciate that different fallback TDD Configuration #s (different than the TDD Config. #s 1 or 2, for example) and associated different SSF config. #s, can be used without departing from the scope and spirit of the present disclosure and the appended claims.

Said differently, and using an example, if the same TDD configuration number is requested by two or more CBSDs 402 in a TCCS (for example, two CBSDs 402 within a selected TCCS request TDD configuration #3 (304d)), but they differ only in their TDD configuration requests with regard to the SSF config. #s that they each request, in accordance with the present methods and apparatus, only the SSF config. #s requested by both CBSDs 402 are used during the voting procedure described hereinabove. In accordance with the present methods and apparatus, the requested TDD configuration #3 304d is left as the selected and applied TDD config. #3 (304d). The SSF config. # to be used is assigned to the CBSDs within the same TCCS as determined using a voting procedure. The requested/desired TDD config. #3 (304d) is allocated to the CBSDs by the CSAS 408. Only the SSF config. # is determined during the voting procedure. This makes the TDD configuration selection more pliable and amicable to the CBSDs requests for same, and is more efficient than the procedures set forth in the incorporate Coexistence Specifications.

Additionally, in accordance with the present methods and apparatus, if any CBSD/DP does not want to use the TDD configuration (including the TDD config # and the SSF config. #) for its transmissions, it can request the CSAS (such as the CSAS 408 shown in FIG. 4) to proceed with a voting procedure using a fallback TDD configuration.

Similar issues can also arise with the TDD configuration suggested by the CBSDs in the fallback TDD configuration. The voting with the fallback TDD configuration is broken into two steps. Step one (1) is to select the Fallback TDD config # to be used, and step two (2) is to select the Fallback SSF config. # to be used by all of the CBSDs within a TCCS grouping. In some embodiments, a simple majority voting is used to select the Fallback TDD config. # and the Fallback SSF config. #. As part of step (1), the selected TDD config # is proposed to the CBSDs/DP within a selected TCCS. In step (2), the CBSDs 402 suggest an SSF config. # that the CBSDs 402 prefer, and this is used for voting based on a simple majority similar to the procedure for the selection of the TDD config # and using the fallback TDD configuration #. Both TDD config. #s and SSF config. #s behavior is controlled by the present TDD Configuration Selection methods and apparatus for all of the CBSDs within a selected TCCS.

In accordance with some embodiments of the present methods and apparatus, the fallback procedure selects a TDD configuration number of either 1 or 2, and it also selects a mandated selection of SSF config. #7 (342, see FIGS. 3C and 3D). In other words, the fallback procedure mandates that the CBSDs 402 within a TCCS use either TDD Configuration numbers 1 or 2, and SSF config. #7 (342). The CBSDs 402 will therefore implicitly align their TDD transmissions with SSF config. #7 (342). Use of the mandatory SSF config. #7 (342) allows CBSD TDD Configurations to align with CBSDs using 5G NR (New Radio) TDD Configurations. This allows for future developments and alignment of CBSDs that may use new or different TDD configurations. As noted above, those of ordinary skill in the wireless communications art shall appreciate that other fallback SSF config. #s can be used without departing from the scope and spirit of the present disclosure and appended claims.

Figure 5:
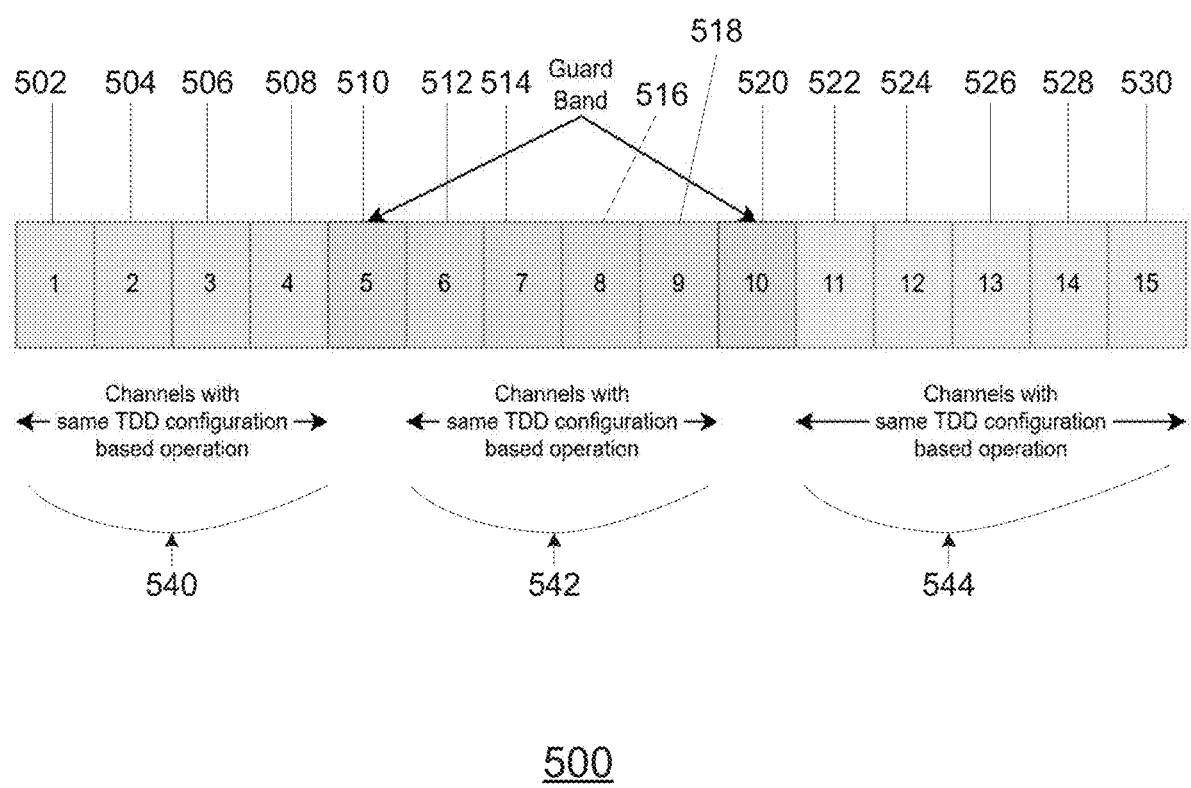
FIG. 5 shows bandwidth allocation of the entire 150 MHz CBRS bandwidth frequency spectrum in accordance with one method of the present methods and apparatus, wherein the entire 150 MHz CBRS network bandwidth is divided into fifteen (15) 10 MHz channels, and wherein the 10 MHz channels are grouped together into three (3) different BW (or "sub-band") groups, and wherein each channel in a BW group uses the same TDD configuration, and wherein the TDD configurations of the BW groups differ from one another.

Bandwidth Allocation of the CBRS Frequency Spectrum—Partitioning Frequency Spectrum into Bandwidth (BW) Groups and Allowing TDD Configuration Selection to be Negotiated by CBSDs within the BW Groups Referring simultaneously to the apparatus 400 shown in FIG. 4 and the CBRS bandwidth allocation pattern 500 shown in FIG. 5, another aspect of the present Time Division Duplex (TDD) Configuration Selection for CBRS Operation with TDD Configuration Mismatch methods and apparatus is now described. FIG. 5 shows bandwidth allocation of the entire CBRS frequency spectrum in accordance with one method of the present methods and apparatus, wherein the entire 150 MHz CBRS network spectrum is divided into fifteen (15) 10 MHz channels, and wherein the 10 MHz channels are grouped together into three (3) different BW (or "sub-band") groups, and wherein each channel in a BW group uses the same TDD configuration, and wherein the TDD configurations of the three (3) different BW groups differ from one another. Although the three (3) different BW groups all use the same TDD Configuration within and for each group, the TDD Configurations of each BW group differs from the TDD Configurations used by the other BW groups.

Referring now more specifically to the 150 MHz CBRS Bandwidth allocation 500 shown in FIG. 5, in accordance with some exemplary embodiments of the present methods and apparatus, the entire 150 MHz CBRS network bandwidth is divided into fifteen (15) 10 MHz channels. Specifically, as shown in FIG. 5 for example, in some embodiments of the present methods and apparatus, the entire 150 MHz CBRS network frequency bandwidth is divided into a first 10 MHz channel 502, a second 10 MHz channel 504, a third 10 MHz channel 506, a fourth 10 MHz channel 508, a 5th 10 MHz channel 510, a 6th 10 MHz channel 512, a 7th 10 MHz channel 514, an 8th 10 MHz channel 516, a 9th 10 MHz channel 518, a 10th 10 MHz channel 520, an 11th 10 MHz channel 522, a 12th 10 MHz channel 524, a 13th 10 MHz channel 526, a 14th 10 MHz channel 528 and a 15th 10 MHz channel 530. As noted above, some of the 10 MHz channels may be allocated for PAL channels and some may be allocated for GAA channels. Further, as shown in FIG. 5, Guard Band channels may be allocated such as Guard Band channel 5 510 and Guard Band channel 10 520. As is now described, the Guard Band channels (i.e., the channels 5 510 and 10 520 in the exemplary allocation of FIG. 5) serve to guard between BW or sub-band groups of channels allocated by the present methods and apparatus.

As shown in the CBRS bandwidth allocation of FIG. 5, in some embodiments, groups of the individual 10 MHz channels are arranged into a pattern of BWs or sub-bands forming three (3) BW groups. For example, as shown in FIG. 5, in the exemplary methods and apparatus, the first four (4) channels (channels 1-4) (502, 504, 506 and 508, respectively) are organized or assigned to a first BW or sub-band group 540. The first four (4) channels comprise a 40 MHz sub-band group 540 of the 150 MHz CBRS frequency spectrum. The next channel in the exemplary BW allocation pattern is a Guard Band channel, namely channel 5 510. The second 40 MHz BW group 542 comprises four (4) channels (channels 6-9) (512, 514, 516 and 518, respectively). This second BW group 542 is similarly separated from a third BW group of channels by a Guard Band channel, namely channel 10 520. The third five (5) 10 MHz channels (channels 11-15) (522, 524, 526, 528 and 530, respectively) are organized or assigned to the third BW or sub-band group 544. Unlike BW groups 540 and 542 (each of which comprise 40 MHz of channel bandwidth), BW or sub-band group 544 comprises 50 MHz of the 150 MHz CBRS frequency spectrum.

Those of ordinary skill in the communications arts shall understand and appreciate that variations on the BW allocation theme and patterns 500 shown in FIG. 5, and described in detail hereinabove, are possible and fall within the scope of the present methods and apparatus and the appended claims. For example, BW group 540 theoretically may comprise only two channels instead of four, BW group 542 theoretically may comprise six channels instead of four, and BW group 544 may comprise 5 channels. Also, those skilled in the communications art shall also realize and appreciate that more than three (3) BW groups or sub-bands can be formed across the entire CBRS 150 MHz spectrum. It is only due to practical considerations now existing that the exemplary bandwidth allocation and BW grouping patterns 500 of FIG. 5 are shown and described. A myriad of combinations of BW groups, placement of the Guard Band channels, number of channels comprising the BW groups, and number of BW groups theoretically may be used without departing from the scope or spirit of the present methods and apparatus or the appended claims.

In some embodiments, the disclosed methods and apparatus use the Coexistence Manager (CxM)/SAS (combination of the SAS (such as the SAS 212 of FIG. 2) and a Coexistence Manager (CxM) 406 of FIG. 4, collectively referred to herein as the "CxM/SAS", or "CSAS" 408 shown in FIG. 4) to allocate the CBRS frequency spectrum and divide it into the BW patterns (such as, for example, the BW pattern 500 of FIG. 5) and BW groups such as that described above with reference to FIG. 5. As described above with reference to FIG. 5, the channels may, in some embodiments of the present methods and apparatus, be divided or allocated into patterns as follows: 40 MHz for BW group 540, [10 MHz Guard Band, channel 5 510], 40 MHz for BW group 542, [10 MHz Guard Band, channel 10 520], and a 50 MHz BW group 544. In accordance with the present methods and apparatus, TDD configurations are advantageously permitted to be negotiated within the BW groups (such as the BW groups 540, 542 and 544) rather than over the entirety of the CBRS 150 MHz frequency band as is now specified and required by the prior art approaches. This BW partitioning can be dynamically enabled in some embodiments, based on the PAL allocations and requests for preferred PAL and GAA TDD configurations. Determination of the required bandwidth partitioning is left for the CSAS 408 (FIG. 4) to ascertain.

In some embodiments, the CxM (such as the CxM 406 shown in FIG. 4) communicates the TDD configurations that are active and the CBSDs can request those channels that they prefer based on the TDD configurations of each channel. In some embodiments, the SAS 212 (FIGS. 2 and 4) allocation of a channel is biased based on the requested TDD configuration and the respective TDD configuration of BW groups that match the requested TDD configuration requests. The amount of channel separation provided for CBSD operation can be determined as part of an allocation and TDD configuration selection process. It is possible for a CBSD to have to settle for a TDD configuration that it does not desire based upon the channel separation requirements that must be met.

In some embodiments, "voting" is supported within the individual bandwidth (BW) groups (or sub-band groups). Each request for a bandwidth allocation is made with an indication of a "vote" for a particular TDD configuration to be applied to a particular bandwidth (BW) group, which is controlled by the SAS 212. Different voting weights for PAL and GAA CBSDs can be accommodated in some embodiments of the present TDD Configuration Selection methods and apparatus. However, with a partitioned bandwidth approach as described herein, most CBSDs will get their preferred TDD configuration. Accordingly, in some embodiments, voting is not as relevant as it might be using the prior art approaches.

In some embodiments, a TDD configuration that is less desired may be accepted by a CBSD based on channel separation requirements for the CBSD that have a higher priority than the requested TTD configuration.

In some cases, the preferred configuration cannot be accommodated and there is no clear way to separate the bandwidth into constituent parts. In such cases, the CxM/SAS (CSAS 408, see FIG. 4) may potentially collapse the full CBRS frequency spectrum into a single "BW" "group", and allow for voting within the entire CBRS network to select the TDD configuration to be used by all of the CBSDs in the entire CBRS network. The present methods and apparatus are used to avoid this scenario, to avoid voting across all of the CBSDs in the 150 MHz CBRS network. However, if there is no clear means for separating the CBRS spectrum, then the fallback position is to proceed to a voting method across the entire CBRS network. This voting will be based on the cardinality of the TDD configurations requested and blindly voting based on the number of TDD configurations requested.

TCCS Definitions—CBSD Voting Weights

In some embodiments, PAL CBSDs use an independent TCCS and GAA CBSDs use a different independent TCCS. During prior art voting procedures, the prior art TDD Configuration selection methods counted the CBSDs "blindly". That is, they did not distinguish between the number of PAL CBSDs that were counted from the number of GAA CBSDs that were counted. Additionally, the prior art voting approaches did not distinguish between the number of indoor CAT-A CBSDs (of which there are typically several in Enterprise Network or CBRS network deployments) from the number of outdoor CAT-B cells (of which there is typically only a few deployed, as compared to the number of indoor CAT-A CBSDs deployed, in a typical Enterprise Network or CBRS network deployment).

As is well known, CBSDs are categorized into two types: CBSD-Category A (CAT-A CBSDs) and CBSD-Category B (CAT-B CBSDs). CAT-A CBSDs are deployed for indoor operation. CAT-B CBSDs are deployed for outdoor operation. CAT-A CBSDs typically transmit at a maximum of 30 dBm (dBm/10 MHz) (maximum EIRP of 20 dBm/MHz) or 1 Watt of power. The CAT-A CBSD transmission power exceeds that of UEs (which typically transmit at or below 23 dBm or 200 milliwatts). In contrast, the CAT-B CBSDs typically transmit at a much higher maximum power of approximately 47 dBm or 50 Watts of transmission power (maximum EIRP of 37 dBm/MHz). In typical Enterprise Network or CBRS network deployments, several (for example, 50, CAT-A CBSDs) are deployed indoors and within buildings in an Enterprise Network. Typically, only a few CAT-B CBSDs are deployed outdoors in the same Enterprise Network (a "few", when compared to the number of CAT-A CBSDs deployed in the same Enterprise Network). Therefore, the prior art approach of using a simple cardinality voting method (i.e., simply counting the number of CBSDs used in a selected TCCS) for the selection of TDD configurations for a TCCS is not sensible or fair. Therefore, the present methods and apparatus provide a weighted voting scheme that takes into account priorities assigned to PAL CBSDs, GAA CBSDs, CAT-A and CAT-B CBSDs.

These different voting methods for PAL CBSDs and GAA CBSDs, and taking into account the number of CAT-A and CAT-B CBSDs, is described in more detail below.

For each PAL and GAA CBSDs in a given TCCS, the below features can be applied for the voting procedures. Voting weights are scaled based on bandwidth for which a CBSD can potentially be eligible. This results in the PAL entities getting voting weights proportional to their purchased CBRS bandwidth and their eligible CBRS bandwidth.

PAL and GAA Voting Weights—PAL and GAA Co-Existence

In accordance with a first approach, PAL CBSDs are weighted based on the amount of spectrum (MHz) purchased by a specific PAL entity. In accordance with the present methods and apparatus, the more CBRS bandwidth spectrum purchased by a PAL entity, the greater the PAL CBSDs count is weighted. For example, if a PAL entity purchased 10 MHz of CBRS spectrum, it is assigned a certain first weight during the counting for purposes of selecting a TDD Configuration for the selected TDD Configuration Connected Set (TCCS) it belongs to. However, if a PAL entity purchased 40 MHz of CBRS spectrum, it is assigned a second higher weight during counting for purposes of selecting a TDD Configuration for its selected TCCS.

Note that a given PAL entity cannot use the CBRS spectrum purchased by other PAL entities. As noted above, 70 MHz of the 150 MHz CBRS band have been purchased and licensed to PAL entities. In some embodiments, and according to the present standards and specification which are subject to change, there can be up to three (3) or four (4) PAL entities per CBRS 150 MHz bandwidth in a particular market or county. PAL entities can purchase a minimum bandwidth of 10 MHz, and a maximum bandwidth up to 40 MHz. Assuming one PAL entity purchases 40 MHz of bandwidth CRBS Radio spectrum, and three (3) other PAL entities each purchase 10 MHz of CBRS spectrum, that leaves the remaining CBRS bandwidth spectrum for use by the GAA CBSDs (but only if they are not trumped by any of the PAL entities desiring to use some or all of the bandwidth allocated for GAA use). So, there may be 3-4 PAL entities in a 150 MHz CBRS spectrum. In addition, any PAL CBSD (whether it purchased a minimum of 10 MHz or a maximum of 40 MHz) may use any of the remaining bandwidth allocated for the GAA CBSDs. A given PAL CBSD cannot use the bandwidth allocated to other PAL CBSDs, however it can use bandwidth that is allocated to GAA CBSDs.

For example, if a PAL purchased 10 MHz of the 150 MHz CBRS spectrum, is eligible to use up to 110 MHz of spectrum (10 MHz of PAL entity bandwidth that it purchased, and up to 100 MHz of GAA eligible Bandwidth). Similarly, if a PAL entity in a certain market purchased 40 MHz of CBRS spectrum, it is eligible to use 140 MHz of the CBRS spectrum (40 MHz eligibility due to the 40 MHz of bandwidth that it purchased, and up to 100 MHz of eligible bandwidth allocated to the GAA entities). This assumes that no other PAL entity has purchased CBRS bandwidth spectrum within this market or county. The SAS, such as the SAS 212 of FIGS. 2 and 4, is in charge of allocating and granting this CBRS bandwidth to the individual PAL and GAA CBSDs.

Therefore, the present methods and apparatus change the voting process for TDD Configuration selection for a given TCCS from a simple cardinality counting of PAL and GAA CBSDs in the TCCS (cardinality approach) to one that weights the counting of the PAL CBSDs counts higher than the counting of the GAA CBSD counts based on the CBRS bandwidth spectrum purchased (or allocated to) the various PAL CBSDs. In accordance with the present methods and apparatus, the weighting of the counts are biased based on the PAL entities, and further based on the extent of CBRS spectrum that the PAL entities purchased and are eligible to use.

PAL and GAA CBSD Voting Weights—Method A

The equations set forth below describe a first method of counting the PAL and GAA CBSDs (and weighting these counts) for use in a TDD Configuration selection for a selected TCCS; wherein the PAL and GAA CBSDs all belong to the same TCCS:

$$\text{CATACBSDVotingWeight}_{PAL} = (1 + (\text{CBSDPurchased-PAL}_{BW}/\text{TotalCBRS}_{BW}));$$

$$\text{CATACBSDVotingWeight}_{GAA} = 1;$$

$$\text{CATBCBSDVotingWeight}_{PAL} = (1 + (\text{CBSDPurchased-PAL}_{BW}/\text{TotalCBRS}_{BW}));$$

and $$\text{CATBCBSDVotingWeight}_{GAA} = 1.$$

Wherein $\text{CATACBSDVotingWeight}_{PAL}$ comprises the voting weight to be applied to a CAT-A PAL CBSD; $\text{CATACBSDVotingWeight}_{GAA}$ comprises the voting weight to be applied to a CAT-A GAA CBSD; $\text{CATBCBSDVotingWeight}_{PAL}$ comprises the voting weight to be applied to a CAT-B PAL CBSD; and wherein $\text{CATBCBSDVotingWeight}_{GAA}$ comprises the voting weight to be applied to a CAT-B GAA CBSD. The term "CBSDPurchasedPAL$_{BW}$" is the amount of bandwidth (in 10 MHz sub-bands or "BWs") purchased by a PAL CBSD. The term "TotalCBRS$_{BW}$" is the total CBRS bandwidth in 10 MHz sub-bands, or "BW"'s. So, essentially the above equations result in a CBSD counting method that gives more weight to PAL CBSDs, and specifically more weight to those PAL CBSDs that have purchased a greater amount of Bandwidth (or spectrum) within the CBRS spectrum. The PAL CBSDs will be given higher weights based on the extent of the CBRS spectrum purchased by any given PAL CBSD.

PAL and GAA CBSD Voting Weights—Method B

The equations set forth below describe a second method of counting the PAL and GAA CBSDs (and weighting these counts) for use in TDD Configuration selection for a selected TCCS; wherein the PAL and GAA CBSDs all belong to the same TCCS:

CATACBSDVotingWeight$_{PAL}$=1;

CATACBSDVotingWeight$_{GAA}$=(TotalCBRS$_{BW}$−
Σ$_{(for\ all\ CBSDs\ in\ county/TCCS)}$CBSDPurchased-
PAL$_{BW}$)/TotalCBRS$_{BW}$;

CATBCBSDVotingWeight$_{PAL}$=1; and

CATBCBSDVotingWeight$_{GAA}$=(TotalCBRS$_{BW}$−
Σ$_{(for\ all\ CBSDs\ in\ county/TCCS)}$CBSDPurchased-
PAL$_{BW}$)/TotalCBRS$_{BW}$.

PAL and GAA CBSD Voting Weights—Method C

The equations set forth below describe a third method of counting the PAL and GAA CBSDs (and weighting these counts) for use in a TDD Configuration selection for a selected TCCS; wherein the PAL and GAA CBSDs all belong to the same TCCS:

CATACBSDVotingWeight$_{PAL}$=((CBSDPurchased-
PAL$_{BW}$+(TotalCBRS$_{BW}$−
Σ$_{(for\ all\ CBSD\ in\ county/TCCS)}$CBSDPurchased-
PAL$_{BW}$))/TotalCBRS$_{BW}$);

CATACBSDVotingWeight$_{GAA}$=(TotalCBRS$_{BW}$−
Σ$_{(for\ all\ CBSD\ in\ county/TCCS)}$CBSDPurchased-
PAL$_{BW}$)/TotalCBRS$_{BW}$;

CATBCBSDVotingWeight$_{PAL}$=((CBSDPurchased-
PAL$_{BW}$+(TotalCBRS$_{BW}$−
Σ$_{(for\ all\ CBSD\ in\ county/TCCS)}$CBSDPurchased-
PAL$_{BW}$))/TotalCBRS$_{BW}$); and CATBCBSDVotingWeight$_{GAA}$=(TotalCBRS$_{BW}$−
Σ$_{(for\ all\ CBSD\ in\ county/TCCS)}$CBSDPurchased-
PAL$_{BW}$)/TotalCBRS$_{BW}$.

PAL and GAA CBSD Voting Weights—BW-Based Weights—Method D

The equation set forth below describes a fourth method of counting the PAL and GAA CBSDs (and weighting these counts) for use in TDD Configuration selection for a selected TCCS, taking into account the BW-based weights; wherein the PAL and GAA CBSDs all belong to the same TCCS:

CBSDVotingWeight$_{PAL}$=(CBSDPurchasedPAL$_{BW}$+TotalAvailableGAA$_{BW}$/TotalCBRS$_{BW}$). The term "CBSDPurchasedPAL$_{BW}$" is the number of channels purchased by a given PAL entity deploying the CBSD. The term "TotalAvailableGAA$_{BW}$" in a TCCS will need to be determined accounting for exclusion zones. Temporary unavailability of the channels due to DPA are ignored for this method.

For each of the PAL and GAA Voting Weights methods described above, all BTS-CBSDs (both PAL and GAA) participate in the TDD Configuration selection procedures and voting methods. PAL CBSDS are allowed greater weight based on the channel bandwidth purchased by its associated PAL entity.

For GAA with the GAA TCCS, each CBSD are given equal weights given that all of the GAA CBSDs are eligible for an equal amount of bandwidth leftover from the PAL allocations (or not used by the PAL CBSDs). Given that it is currently not possible to determine the small, typical, maximum size of what a selected TCCS can be, a first approach is to give both CAT-A and CAT-B CBSDs equal weight during the voting procedure. With regard to relative voting weights for CATA and CATB CBSDs: PAL TCCS—the voting weight for CATA: CATB=1: (3 or 2); GAA TCCS—the voting weight for CATA:CATB=1:1. Support is provided for "Secondary TDD configuration", as defined per the initial ballot version, and will be applicable within each of the PAL and GAA TCCSs together with interference mitigation steps.

In some embodiments, size determination for a TCCS can be varied; CATA versus CATB weighting ratio can be adjusted. Harmful interference may be managed with use of secondary TDD configurations. Also, channel isolation/allocation can be used to accommodate multiple TDD configuration in a selected TCCS.

Figure 6:
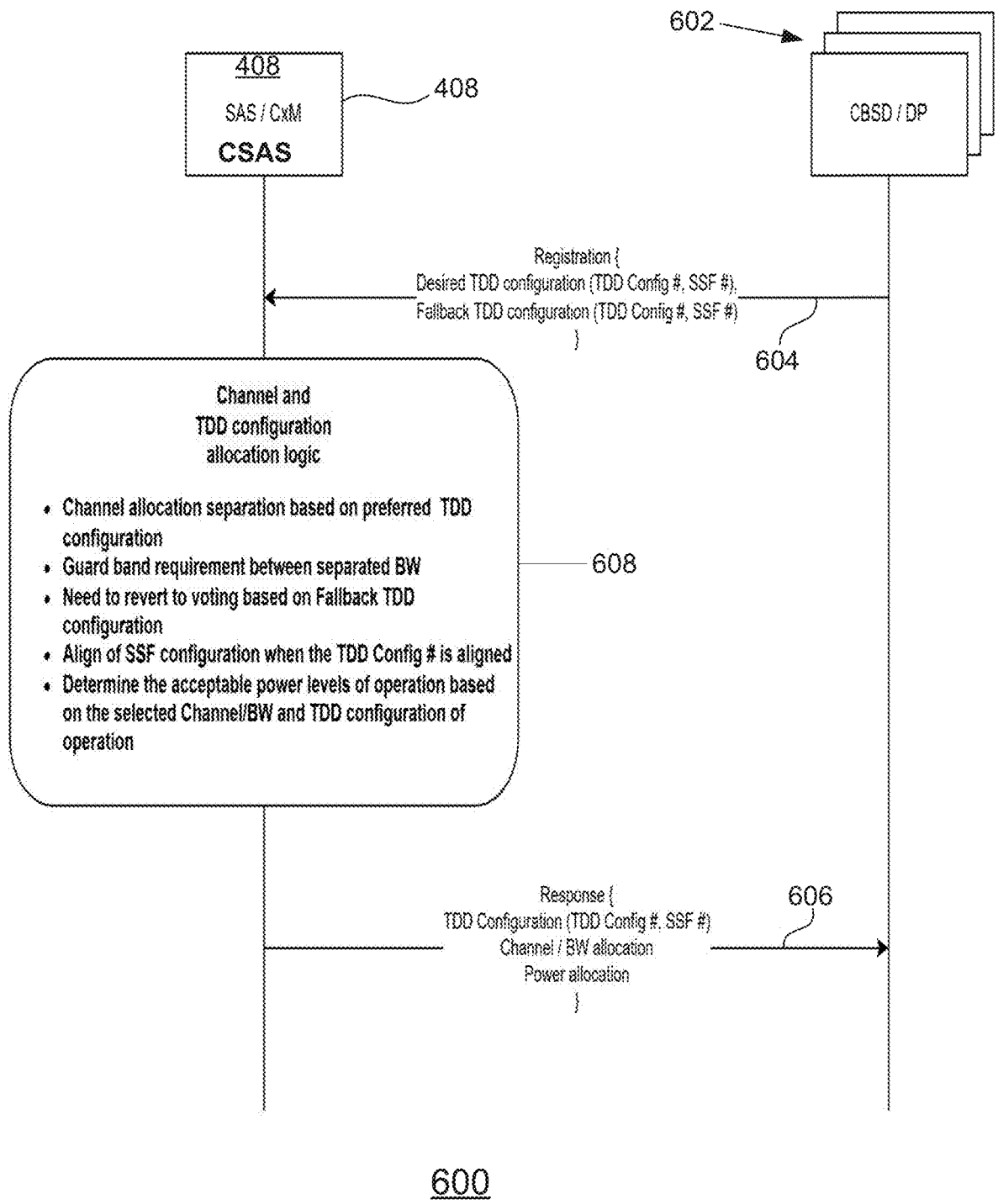
FIG. 6 shows a simplified block diagram of an exemplary apparatus for TDD Configuration selection in accordance with the present methods and apparatus for a plurality of CBSDs, and further shows the flow of information between the plurality of CBSDs and a CSAS.
Figure 7:
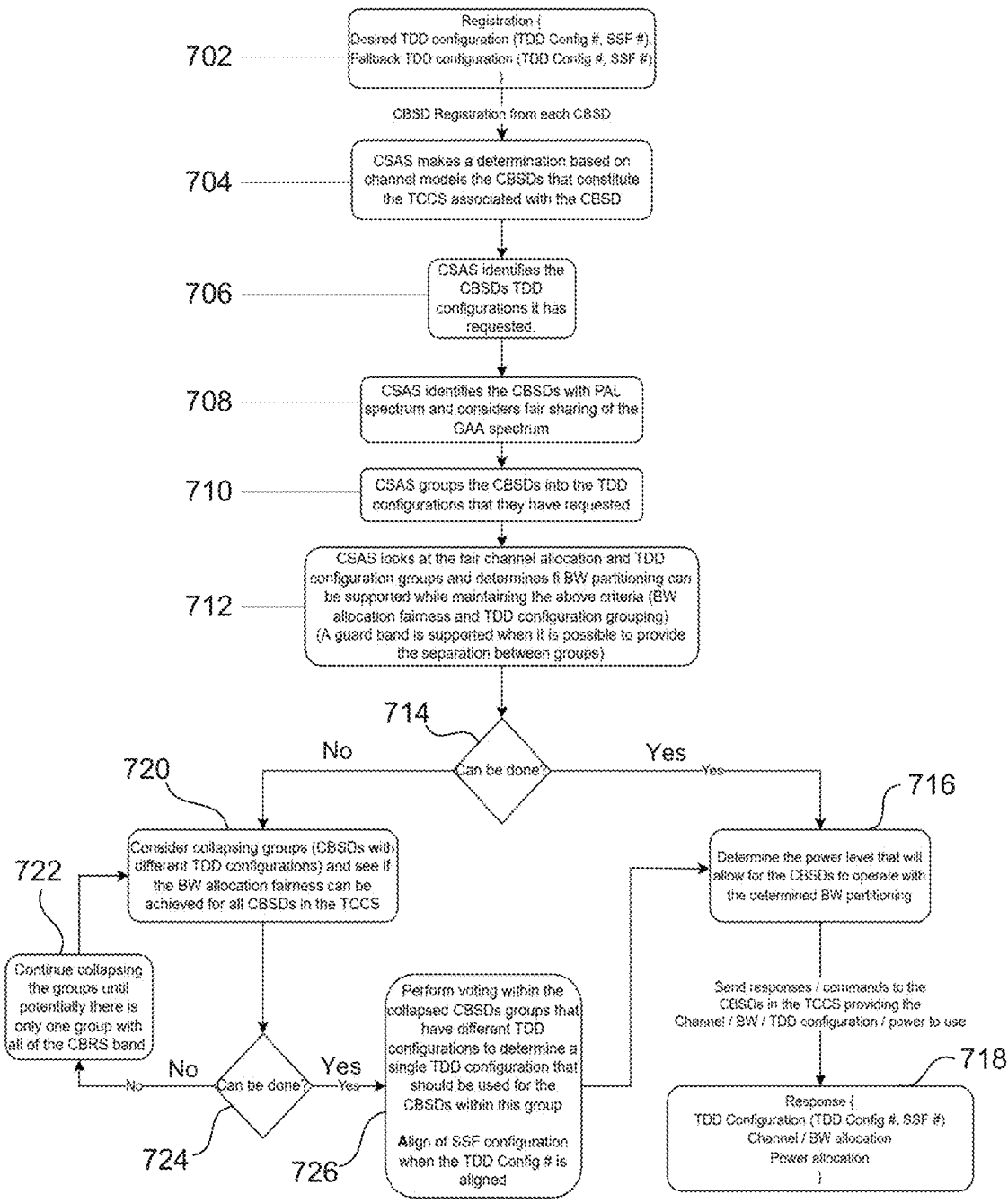
FIG. 7 is a flowchart of an exemplary method for channel and TDD Configuration allocation that may be used in implementing some embodiments of the present TDD Configuration Selection for CBRS Operation with TDD Configuration Mismatch methods and apparatus.

FIGS. 6 AND 7—Exemplary Apparatus and Method of the Present TDD Configuration Selection Configuration Selection for CBRS Operation with TDD Configuration Mismatch FIGS. 6 and 7 show an exemplary apparatus (FIG. 6) and an exemplary method (FIG. 7) for TDD Configuration Selection for CBRS Operation with TDD Configuration Mismatch in accordance with the present disclosure.

FIG. 6 shows a simplified block diagram of an exemplary apparatus used to perform TDD Configuration Selection for CBRS Operation with TDD Configuration Mismatch 600 in accordance with the present disclosure. As shown in FIG. 6, the exemplary apparatus 600 comprises a plurality of CBSDs/DPs (CBSDs/Domain Proxies) 602, a CSAS 408 (similar to the CSAS 408 described above with reference to FIG. 4), a Channel and TDD configuration allocation logic block 608 which in some embodiments is implemented as part of the CSAS 408, and communication lines 604 and 606 that communicate information between the plurality of CBSDs/DPs 602 and the block 608. As noted above, the CSAS 408, in some embodiments, performs the functions shown in the Channel and TDD configuration allocation logic block 608.

FIG. 6 further shows the flow of information (Requests and Responses to the requests) between the plurality of CBSDs/DPs 602 and a CSAS 408 (such as CSAS 408 and the logic block 608)). The plurality of CBSDs/DPs 602 shown in FIG. 6 are similar in function and operation to the plurality of CBSDs 402 described above with reference to FIG. 4. They each have associated and corresponding Domain Proxies (DPs) which are similar in function and operation to the Domain Proxy (DP) 404 described above with reference to FIG. 4.

FIG. 6 also shows aspects and functionality performed by the Channel and TDD configuration allocation logic block 608. As shown in FIG. 6, the CSAS 408 (using the Channel and TDD configuration allocation logic block 608) performs the channel and TDD configuration allocation processes responsive to requests received from the plurality of CBSD/DPs 602. The requests received from the plurality of CBSD/DPs 602 are communicated to the Channel and TDD configuration allocation logic block 608 via the communication line 604. As shown in FIG. 6, the requests from the plurality of CBSDs/DPs 602 are referred to as "Registration" requests. The Registration requests include the desired TDD configurations (desired by the CBSD/DPs 602 and including a desired TDD config. # and desired SSF config. #). The registration requests received from the CBSD/DPs 602 also include Fallback TDD Configurations including Fallback TDD config. #s and Fallback SSF config. #s.

As described in more detail hereinabove, the CSAS 408 accepts the "registration" requests from the plurality of CBSD/DPs 602 and performs channel and TDD configuration and allocation processes in response thereto. As shown in the Channel and TDD configuration allocation logic block 608 in FIG. 6, the CSAS 408 performs channel allocation separation based on the preferred TDD configurations. It ensures that sufficient Guard Band requirements between the separate BW groups are satisfied. It may need to revert to a voting procedure based on the Fallback TDD configurations. The Channel and TDD configuration allocation block 608 also attempts to align the SSF configuration when the TDD config. # is aligned. Lastly, the block 608 determines the acceptable power levels of operation based upon the selected Channel/BW and the selected TDD Configuration.

The block 608 generates responses to the plurality of CBSD/DPs 602 based upon the determined TDD configuration allocation results and it transmits these responses to the plurality of CBSD/DPs 602 via the communication line 606. As described above in more detail, the responses transmitted by the block 608 to the plurality of CBSD/DPs 602 contain the TDD Configuration (including the TDD config. # and SSF config. #) for the CBSDs 402. 602 to use. The responses also include the Channel/BW allocation and the Power Allocation to be used by the CBSDs 402, 602. The details of the responses from the block 608 to the plurality of CBSD/DPs 602 are described in greater detail hereinabove with reference to the responses from the CSAS 408 to the plurality of CBSDs 402 of FIG. 4.

FIG. 7 is a flowchart of one exemplary method 700 for channel and TDD Configuration allocation logic that may be used in implementing some embodiments of the present TDD Configuration Selection for CBRS Operation with TDD Configuration Mismatch methods and apparatus. The method 700 shown in FIG. 7 provides additional details of the processes performed by the CSAS 408 (described above with reference to FIGS. 4 and 6) and the Channel and TDD Configuration Allocation Logic block 608 (described above with reference to FIG. 6.).

As shown in the method 700 of FIG. 7, the method 700 begins at a Step 702 whereat "Registration" requests are received from the plurality of CBSDs 402 (402 in FIGS. 4 and 602 in FIG. 6) as previously described. The registration requests contain desired and fallback TDD configurations including desired and fallback TDD config. #s and fallback SSF config. #s, as described above with reference to FIG. 6. The method 700 then proceeds to a Step 704 whereat the CSAS 408 makes a determination based upon channel models of the CBSDs 402, 602 that constitute the TCCS associated with a given CBSD 402, 602.

The method 700 then proceeds to a Step 706 whereat the CSAS 408 identifies the CBSDs' TDD configurations that have been requested by the CBSDs 402, 602. The method 700 then proceeds to a Step 708 whereat the CSAS 408 identifies the PAL CBSDs 402, 602 having allocated PAL CBRS spectrum, and determines how to fairly share this spectrum with the GAA CBSDs. The method then proceeds to a Step 710 whereat the CSAS 408 (or the logic block 608 of FIG. 6) groups the CBSDs 402, 602 requesting the same TDD Configurations into distinct CBSD groupings. That is, if a number of CBSDs 402, 602 request the same TDD Configurations, the CSAS 408 via the logic block 608 (FIG. 6) groups those CBSDs into a distinct and separate group of CBSDs 402. The method then proceeds to a Step 712. At the Step 712, the CSAS 408 reviews the fair channel allocation and the various TDD Configuration groups and makes a determination as to whether the CBRS 150 MHz frequency spectrum can be divided into distinct and separate BW groups. The CSAS 408 makes this determination based upon whether it can divide the CBRS frequency spectrum into BW groups while still maintaining required criteria such as BW allocation fairness (spectrum fairness between PAL and GAA CBSDs) and TDD Configuration groupings. If the CSAS 408 determines that the CBRS spectrum can be divided into separate and distinct BW groups, it provides Guard Band channels between the BW groups to ensure non-interference between the BW groups during operation.

The method 700 then proceeds to a decision Step 714. At the decision Step 714, the CSAS 408 determines whether the BW groups can be implemented in light of the considerations described above.

If the answer is "Yes" at the Step 714, and the BW groups can be implemented, then the method 700 proceeds to a Step 716 whereat the CSAS 408 determines a power level that the CBSDs should transmit at. The power levels should be set such that they allow the CBSDs 402, 602 to operate properly given the BW partitioning in use (BW partitioned by the CSAS 408 into the various BW groups), and as determined and dictated by the CSAS 408. The CSAS 408 then sends responses/commands (via the communication link 606 of FIG. 6, for example) to the plurality of CBSDs 402, 602. The CSAS 408 instructs the CBSDs 402, 602 in the TCCS what channels they can transmit on, the BW group that the CBSDs in the TCCS belong to, and the TDD configuration the CBSDs 402 should use (including the SSF config. #). The CSAS 408 also instructs the CBSDs 402 what power level to use when transmitting. These responses/commands are then received by the CBSDs 402, 602 at a Step 718 of the method 700.

If, however, at the decision Step 714, the answer is "NO", this indicates that the CSAS 408 determines that the BW grouping cannot be implemented in light of the considerations described above, and the method 700 proceeds to a Step 720. At the Step 720, the CSAS 408 considers collapsing some of the groups (comprising CBSDs with different TDD Configurations) to determine if the BW allocation fairness requirements can be achieved for all CBSDs in the TCCS. The CSAS 408 does this and then determines in a decision Step 724, whether, having done so, the BW allocation fairness requirements can be achieved for all of the CBSDs 402, 602 in a given TCCS. Accordingly, the method 700 proceeds to a decision Step 724 to determine whether or not the BW allocation fairness is achieved by collapsing the groups at the Step 720. A "NO" outcome of the decision step 724 means that the collapsing of BW groups in the Step 720 did not achieve the desired BW fairness allocation requirements for all of the CBSDs 402 in the TCCS. If the decision Step 724 produces a "NO" determination, the method proceeds to a Step 722.

At the Step 722, the CSAS 408 continues to collapse the groups until there potentially is only one group remaining for the entire CBRS frequency spectrum. The method returns to the Step 720, collapsing groups until it either collapses all of the BW groups so that there is only one group remaining for the entire CBRS frequency spectrum (Step 722), or until it receives a "YES" outcome at the decision Step 724.

If the method 700 receives a "YES" output at the decision Step 724, it proceeds to a Step 726. At the Step 726, the CSAS 408 performs a voting procedure within the collapsed CBSD groups that have different TDD Configurations. This voting procedure is performed to determine or find a single TDD Configuration that should be used by all of the CBSDs 402, 602 within a selected collapsed CBSD group. If such a single TDD Configuration is determined by the CSAS 408 for this CBSD BW group in a selected TCCS, the SSF configuration # is also aligned when the TDD config. # is aligned.

Summary of Attributes and Benefits of the Present Methods and Apparatus for TDD Configuration Selection for CBRS Operation with TDD Configuration Mismatch The disclosed methods and apparatus described above allow multiple TDD configurations to be supported within a TCCS. In addition, both DL centric and UL centric traffic are enabled based on channel separation and the use of different TDD configurations within each bandwidth partition or BW grouping. The presently disclosed methods and apparatus enable TDD configurations to be negotiated in a Bandwidth-partitioned (or "sub-band"-partitioned) manner. Furthermore, dynamic creation of the bandwidth partitions (or sub-bands) (BW groups) is possible within the CBRS spectrum. BW groupings and partitioning is not static. It depends on the use cases for the CBSDs in the CBRS network, the constitution of the TCCS and the different TDD configurations requested by the plurality of CBSDs 402. In accordance with the present methods and apparatus, multiple TDD configurations are supported within a single TCCS. Both DL centric and UL centric traffic is possible based on channel separation and use of different TDD configurations for the divided and identified BW groups. Still further, Guard Bands can be established to avoid inter-carrier interference across the partitioned bandwidths (i.e., across the different BW groups).

In some embodiments of the disclosed methods and apparatus, a procedure is implemented that proceeds to voting using a desired TDD configuration and using the voting method to determine the SSF config. # to be used. The procedure is triggered based on the CBSDs in the TCCS requesting the same TDD config # with potentially different SSF config. #s. A majority of the CBSDs proposing an SSF config. # will be used and recommended to the CBSDs DP 602 in a response message from the CSAS 408.

If any of the CBSD/DPs 602 do not want to use the TDD configuration (including the TDD config # and the SSF config. #), then they can request the CSAS 408 (FIG. 5) to proceed with a voting method with the fallback TDD configuration.

The voting with the fallback TDD configuration is broken into two parts. In a first part, the TDD config # is selected and in the second part the SSF config. # is selected. A simple majority vote is used for this procedure in some embodiments. As part of step 1, the selected TDD config # is proposed to the CBSDs/DP 602. The CBSDs 402, 602 suggest an SSF config. # that they prefer, and the voting is based on simple majority voting similar to the method of voting used to determine the TDD config # selection with the fallback TDD configuration. The fallback position is to select a TDD configuration using a simple blind voting method across all of the CBSDs 402 in the CBRS network.

BRIEF SUMMARY

Methods and apparatus that allocate bandwidth and select TDD configurations in a manner that allows maximum cooperation between GAA and PAL CBSDs, and that include procedures that avoid forcing the procedures into a fallback mode whenever a TDD configuration mismatch occurs are described. The methods and apparatus allocate an appropriate TDD configuration across all of the CBSDs (BS/APs) in the CBRS network so that there is minimal interreference between the CBSDs and so that there is uniform usage of the bandwidth in terms of use cases across all of the CBSDs in a given CBRS network. Methods of biasing the behavior of the CBSDs TDD configurations based on the purchase of the channels made by the PAL CBSDs so that PAL CBSDs obtain a higher weight regarding the selection of correct TDD configurations are described. The methods account for voting so that correct TDD configurations are selected.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for channel allocation and selection of a correct Time Division Duplex (TDD) configuration for a plurality of Citizens Broadbroad Radio Service Devices (CBSDs) operating within a wireless Citizen's Broadband Radio Service (CBRS) Enterprise Network, wherein the CBRS Enterprise Network has an available CBRS frequency spectrum of 150 MHZ, and wherein some of the plurality of CBSDs belong to a selected one TDD Configuration Connected Set (TCCS), comprising:
   a) receiving a plurality of registration requests from a plurality of CBSDs in a selected TCCS, wherein the plurality of registration requests include TDD configurations and fallback TDD configurations desired by the plurality of CBSDs, and wherein the desired TDD configurations include desired Special Subframe configuration numbers, and wherein the fallback TDD configurations include fallback SSF configuration numbers;
   b) identifying Priority Access License (PAL) and GAA (General Availability Access) CBSDs, in the plurality of CBSDs belonging to the TCCS;
   c) determining if the 150 MHz CBRS frequency spectrum can be fairly shared between the PAL and GAA CBSDs, wherein the fairness determination is partly based on the CBRS spectrum eligible to both the PAL and GAA CBSDs, and is also partly based on the CBRS spectrum that has been allocated to the PAL and GAA CBSDs;
   d) if the CBRS frequency spectrum can be fairly shared as determined in the step c), dividing the CBRS frequency spectrum into BW (bandwidth) groups based on the TDD configurations requested by the plurality of CBSDs in the step a), and arranging the BW groups into separate and distinct frequency spectrum BW groups of various bandwidths based on the number of different TDD configurations requested;
   e) determining selected first distinct TDD configurations for each of the BW groups, wherein none of the BW groups have the same TDD configuration; and
   f) instructing the CBSDs in the TCCS which BW group that they are assigned to, instructing the CBSDs in each of their respective BW groups which channels to use for communication transmissions, and further instructing the CBSDs in the TCCS what power level to use when making their transmissions.

2. The method for channel allocation and selection of a correct TDD configuration of claim 1, further comprising instructing the CBSDs assigned to each of the BW groups which of the selected first distinct TDD configurations will be used for each of the BW group that the CBSDs are assigned to.

3. A method for channel allocation and selection of a correct Time Division Duplex (TDD) configuration for a plurality of Citizens Broadbroad Radio Service Devices (CBSDs) operating within a wireless Citizen's Broadband Radio Service (CBRS) Enterprise Network, wherein the CBRS Enterprise Network has an available CBRS frequency spectrum of 150 MHZ, and wherein some of the plurality of CBSDs belong to a selected one TDD Configuration Connected Set (TCCS), comprising:
   a) receiving a plurality of registration requests from a plurality of CBSDs in a selected TCCS, wherein the plurality of registration requests include TDD configurations and fallback TDD configurations desired by the plurality of CBSDs, and wherein the desired TDD configurations include desired Special Subframe configuration numbers, and wherein the fallback TDD configurations include fallback SSF configuration numbers;
   b) identifying Priority Access License (PAL) and GAA (General Availability Access) CBSDs, in the plurality of CBSDs belonging to the TCCS;
   c) determining if the 150 MHz CBRS frequency spectrum can be fairly shared between the PAL and GAA CBSDs, wherein the fairness determination is partly based on the CBRS spectrum eligible to both the PAL and GAA CBSDs, and is also partly based on the CBRS spectrum that has been allocated to the PAL and GAA CBSDs;
   d) if the CBRS frequency spectrum can be fairly shared as determined in the step c), dividing the CBRS frequency spectrum into BW (bandwidth) groups based on the TDD configurations requested by the plurality of CBSDs in the step a), and arranging the BW groups into separate and distinct frequency spectrum BW groups of various bandwidths based on the number of different TDD configurations requested; and
   e) determining selected first distinct TDD configurations for each of the BW groups, wherein none of the BW groups have the same TDD configuration, further comprising dividing the CBRS frequency spectrum into three separate and distinct BW groups, wherein a BW group 1 has 40 MHz of frequency_spectrum, a BW group 2 has 40 MHz of frequency spectrum, and a BW group 3 has 50 MHz of frequency spectrum.

4. The method for channel allocation and selection of a correct TDD configuration of claim 3, further comprising instructing the CBSDs in the TCCS which BW group that they are assigned to.

5. The method for channel allocation and selection of a correct TDD configuration of claim 3, further comprising establishing Guard Bands between the three separate and distinct BW groups.

6. The method for channel allocation and selection of a correct TDD configuration of claim 5, wherein a first Guard Band is placed between the BW group 1 and the BW group 2, and wherein a second Guard Band is placed between the BW group 2 and the BW group 3, and wherein the Guard Bands comprise 10 MHz frequency channels.

7. A method for channel allocation and selection of a correct Time Division Duplex (TDD) configuration for a plurality of Citizens Broadbroad Radio Service Devices (CBSDs) operating within a wireless Citizen's Broadband Radio Service (CBRS) Enterprise Network, wherein the CBRS Enterprise Network has an available CBRS frequency spectrum of 150 MHZ, and wherein some of the plurality of CBSDs belong to a selected one TDD Configuration Connected Set (TCCS), comprising:
   a) receiving a plurality of registration requests from a plurality of CBSDs in a selected TCCS, wherein the plurality of registration requests include TDD configurations and fallback TDD configurations desired by the plurality of CBSDs, and wherein the desired TDD configurations include desired Special Subframe configuration numbers, and wherein the fallback TDD configurations include fallback SSF configuration numbers;

b) identifying Priority Access License (PAL) and GAA (General Availability Access) CBSDs, in the plurality of CBSDs belonging to the TCCS;

c) determining if the 150 MHz CBRS frequency spectrum can be fairly shared between the PAL and GAA CBSDs, wherein the fairness determination is partly based on the CBRS spectrum eligible to both the PAL and GAA CBSDs, and is also partly based on the CBRS spectrum that has been allocated to the PAL and GAA CBSDs;

d) if the CBRS frequency spectrum can be fairly shared as determined in the step c), dividing the CBRS frequency spectrum into BW (bandwidth) groups based on the TDD configurations requested by the plurality of CBSDs in the step a), and arranging the BW groups into separate and distinct frequency spectrum BW groups of various bandwidths based on the number of different TDD configurations requested; and e) determining selected first distinct TDD configurations for each of the BW groups, wherein none of the BW groups have the same TDD configuration, wherein if it is determined that the entire CBRS 150 MHz frequency spectrum cannot be divided into distinct and separate BW groups, collapsing the groups of CBSDs requesting different TDD configurations and then determining if the BW allocation fairness requirements are met.

8. The method for channel allocation and selection of a correct TDD configuration of claim 7, wherein if it is determined that the collapsed groups of CBSDs requesting different TDD configurations meets the BW allocation fairness requirements, proceeding to a voting method to determine a second selected TDD configuration to use by the CBSDs that requested the different TDD configurations, and wherein the second selected TDD configuration includes an SSF configuration.

9. The method for channel allocation and selection of a correct TDD configuration of claim 8, further aligning the SSF configuration when the second selected TDD configuration has been aligned.

10. The method for channel allocation and selection of a correct TDD configuration of claim 8, wherein the voting method to determine the second selected TDD configuration comprises a simple majority vote of the CBSDs that requested different TDD configurations.

11. The method for channel allocation and selection of a correct TDD configuration of claim 10, wherein the voting method biases the counts for the PAL CBSDs by assigning voting weights to PAL CBSD counts.

12. The method for channel allocation and selection of a correct TDD configuration of claim 11, wherein the PAL CBSD counts are weighted based on the CBRS spectrum purchased for the PAL CBSDs, and also based upon the eligible CBRS spectrum of each of the PAL CBSDs.

13. An apparatus capable of performing Time Division Duplex (TDD) Configuration Selection for Citizen Band Radio Service (CBRS) Operation with TDD Configuration Mismatch, comprising:

a) a plurality of Citizens Broadband Radio Service Devices (CBSDs) operating within a wireless Citizen's Broadband Radio Service (CBRS) Enterprise Network wherein the CBRS Enterprise Network has an available CBRS frequency spectrum of 150 MHz, and wherein some of the plurality of CBSDs belong to a selected one TDD Configuration Connected Set (TCCS);

b) a plurality of Domain Proxies (DPs) associated and corresponding to each of the CBSDs in the plurality of CBSDs, wherein the DPs are in communication with each of their associated CBSDs, and wherein the Domain Proxies provide a translational capability to interface legacy radio equipment in the 3650-3700 MHZ CBRS frequency band; and c) a CBRS Spectrum Access System (CSAS) in communications with both the plurality of DPs and the plurality of CBSDs, wherein the CSAS comprises a Spectrum Access System (SAS) and a Coexistence Manager (CxM), and wherein the SAS manages wireless communications of devices transmitting in the CBRS frequency spectrum in order to prevent harmful interference to high priority or high tiered users;

and wherein the CSAS identifies one or more sets of CBSDs within the plurality of CBSDs and provides the CxM with a spectrum assignment for each set of CBSDs, and wherein the CxM performs primary channel assignments consistent with the operation of the CBSDs, and wherein the CxM informs the CSAS regarding General Availability Access (GAA) CBSD Channel Assignments, and wherein the CSAS receives Registration requests for desired and fallback TDD configurations from the plurality of CBSDs, and based on the Registration requests, the CSAS performs the following:

(1) channel allocation separation based on preferred TDD configurations, wherein the preferred TDD configurations are requested by the plurality of CBSDs, and wherein the preferred TDD configurations also include preferred Special Subframe (SSF) configurations;

(2) receiving requests from the plurality of CBSDs, wherein the requests include the preferred TDD configurations having associated preferred SSF configurations and fallback TDD configurations having SSF configurations, and dividing the CBRS frequency spectrum into distinct and separate BW (bandwidth) groups, wherein each BW group has different selected TDD Configurations assigned to them by the CSAS, and wherein the assigned TDD configurations are based upon the preferred TDD configurations and fallback TDD configurations requested by the plurality of CBSDs;

(3) assigning Guard band frequency channels between each of the BW groups created in the step (2), wherein the Guard band frequency channels prevent transmissions from one BW group to interfere with transmissions from another BW group;

(5) reverting to voting based on the requested fallback TDD configurations if necessary to satisfy BW fairness requirements;

(6) aligning the SSF configurations when the TDD configurations are aligned; and (7) determining acceptable power levels of operation based on the BW groups and their associated selected TDD configurations.

14. A wireless Enterprise Network capable of Time Division Duplex (TDD) Configuration Selection for Citizen Band Radio Service (CBRS) Operation with TDD Configuration Mismatch, comprising:

a) a plurality of Citizens Broadband Radio Service Devices (CBSDs) operating within a wireless Citizen's Broadband Radio Service (CBRS) Enterprise Network; wherein the CBRS Enterprise Network has an available CBRS frequency spectrum of 150 MHz, and wherein some of the plurality of CBSDs belong to a selected one TDD Configuration Connected Set (TCCS);

b) a plurality of UEs in wireless communication with the plurality of CBSDs, wherein the UEs are serviced by one of the CBSDs in the Enterprise Network;

c) a plurality of Domain Proxies (DPs) associated and corresponding to each of the CBSDs in the plurality of CBSDs, wherein the DPs are in communication with each of their associated CBSDs;

d) a CBRS Spectrum Access System (CSAS) in communications with both the plurality of DPs and the plurality of CBSDs, wherein the CSAS comprises a Spectrum Access System (SAS) and a Coexistence Manager (CxM), and wherein the SAS manages wireless communications of devices transmitting in the CBRS frequency spectrum of the Enterprise Network in order to prevent harmful interference to high priority or high tiered users; and wherein the CSAS receives requests from the plurality of CBSDs and transmits responses to the plurality of CBSDs responsive to the requests; and wherein the CSAS divides the CBRS frequency spectrum into separate and distinct BW (bandwidth) groups comprising a plurality of frequency channels, and wherein the CSAS selects TDD configurations and assigns the selected TDD configurations to each BW group, and wherein the TDD configurations assigned to each BW group are unique to each group, wherein the CSAS selects the TDD configurations that are assigned to each of the BW groups based on the requests received from the plurality of CBSDs, and wherein the CSAS selects the TDD configurations that are assigned to each of the BW groups based upon a voting method, and wherein the plurality of CBSDs comprise both PAL and GAA CBSDs, and wherein the PAL CBSDs are given greater weight than are the GAA CBSDs during the voting method.

15. The wireless Enterprise Network capable of Time Division Duplex (TDD) Configuration Selection for Citizen Band Radio Service (CBRS) Operation with TDD Configuration Mismatch of claim 14, wherein the PAL CBSDs are owned by associated and corresponding PAL entities, and wherein the PAL CBSDs are given greater weight than are the GAA CBSDs based upon the extent of CBRS spectrum that the PAL entities purchased and are eligible to use.

16. The wireless Enterprise Network capable of Time Division Duplex (TDD) Configuration Selection for Citizen Band Radio Service (CBRS) Operation with TDD Configuration Mismatch of claim 15, the PAL CBSDs are owned by associated and corresponding PAL entities, and wherein the PAL CBSDs are given greater weight than are the GAA CBSDs based upon the extent of CBRS spectrum that the PAL entities purchased and are eligible to use.

17. The wireless Enterprise Network capable of Time Division Duplex (TDD) Configuration Selection for Citizen Band Radio Service (CBRS) Operation with TDD Configuration Mismatch of claim 14, wherein the weights are assigned to the PAL and GAA CBSDs all belonging to the same TCCS in accordance with the following equations:

$$\text{CATACBSDVotingWeight}_{PAL} = (1 + (\text{CBSDPurchasedPAL}_{BW}/\text{TotalCBRS}_{BW}));$$

$$\text{CATACBSDVotingWeight}_{GAA} = 1;$$

$$\text{CATBCBSDVotingWeight}_{PAL} = (1 + (\text{CBSDPurchasedPAL}_{BW}/\text{TotalCBRS}_{BW}));$$

and $$\text{CATBCBSDVotingWeight}_{GAA} = 1;$$

wherein CATACBSDVotingWeight$_{PAL}$ comprises the voting weight to be applied to a CAT-A PAL CBSD; CATACBSDVotingWeight$_{GAA}$ comprises the voting weight to be applied to a CAT-A GAA CBSD; CATBCBSDVotingWeight$_{PAL}$ comprises the voting weight to be applied to a CAT-B PAL CBSD; and wherein CATBCBSDVotingWeight$_{GAA}$ comprises the voting weight to be applied to a CAT-B GAA CBSD; and wherein "CBSDPurchasedPAL$_{BW}$" comprises an amount of bandwidth (in 10 MHz sub-bands or "BWs") purchased by a selected PAL CBSD entity; and wherein "TotalCBRS$_{BW}$" comprises the total CBRS bandwidth in 10 MHz sub-bands.

18. The wireless Enterprise Network capable of Time Division Duplex (TDD) Configuration Selection for Citizen Band Radio Service (CBRS) Operation with TDD Configuration Mismatch of claim 14, wherein the weights are assigned to the PAL and GAA CBSDs all belonging to the same TCCS in accordance with the following equations:

$$\text{CATACBSDVotingWeight}_{PAL} = 1;$$

$$\text{CATACBSDVotingWeight}_{GAA} = (\text{TotalCBRS}_{BW} - \Sigma_{(for\ all\ CBSDs\ in\ county/TCCS)} \text{CBSDPurchasedPAL}_{BW})/\text{TotalCBRS}_{BW};$$

$$\text{CATBCBSDVotingWeight}_{PAL} = 1;\ \text{and}$$

$$\text{CATBCBSDVotingWeight}_{GAA} = (\text{TotalCBRS}_{BW} - \Sigma_{(for\ all\ CBSDs\ in\ county/TCCS)} \text{CBSDPurchasedPAL}_{BW}).$$

19. The wireless Enterprise Network capable of Time Division Duplex (TDD) Configuration Selection for Citizen Band Radio Service (CBRS) Operation with TDD Configuration Mismatch of claim 14, wherein the weights are assigned to the PAL and GAA CBSDs all belonging to the same TCCS in accordance with the following equations:

$$\text{CATACBSDVotingWeight}_{PAL} = ((\text{CBSDPurchasedPAL}_{BW} + (\text{TotalCBRS}_{BW} - \Sigma_{(for\ all\ CBSD\ in\ county/TCCS)} \text{CBSDPurchasedPAL}_{BW}))/\text{TotalCBRS}_{BW});$$

$$\text{CATACBSDVotingWeight}_{GAA} = (\text{TotalCBRS}_{BW} - \Sigma_{(for\ all\ CBSD\ in\ county/TCCS)} \text{CBSDPurchasedPAL}_{BW})/\text{TotalCBRS}_{BW};$$

$$\text{CATBCBSDVotingWeight}_{PAL} = ((\text{CBSDPurchasedPAL}_{BW} + (\text{TotalCBRS}_{BW} - \Sigma_{(for\ all\ CBSD\ in\ county/TCCS)} \text{CBSDPurchasedPAL}_{BW}))/\text{TotalCBRS}_{BW});\ \text{and}$$

$$\text{CATBCBSDVotingWeight}_{GAA} = (\text{TotalCBRS}_{BW} - \Sigma_{(for\ all\ CBSD\ in\ county/TCCS)} \text{CBSDPurchasedPAL}_{BW})/\text{TotalCBRS}_{BW}.$$

20. The wireless Enterprise Network capable of Time Division Duplex (TDD) Configuration Selection for Citizen Band Radio Service (CBRS) Operation with TDD Configuration Mismatch of claim 14, wherein the weights are assigned to the PAL and GAA CBSDs all belonging to the same TCCS in accordance with the following equation:

(a) $\text{CBSDVotingWeight}_{PAL} = (\text{CBSDPurchasedPAL}_{BW} + \text{TotalAvailableGAA}_{BW}/\text{TotalCBRS}_{BW});$ wherein "CBSDPurchasedPAL$_{BW}$" comprises a number of channels purchased by a given PAL entity deploying a PAL CBSD.

* * * * *